United States Patent
Smith et al.

(10) Patent No.: US 11,120,639 B1
(45) Date of Patent: Sep. 14, 2021

(54) PROJECTING TELEMETRY DATA TO VISUALIZATION MODELS

(71) Applicant: Microsoft Technology Licensing, LLC, Redmond, WA (US)

(72) Inventors: Jesse MacDonald Smith, Seattle, WA (US); Eric Charles Youngstrom, Kirkland, WA (US); Jeremy Brent Jackson, Bellevue, WA (US); Nicholas James Pavlovsky, Duvall, WA (US); Jason John Fierst, Sammamish, WA (US); Daniel Taylor Rosas, Kirkland, WA (US); George Oliver Johnston, Redmond, WA (US); Ted Tai-Yu Chen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/857,741

(22) Filed: Apr. 24, 2020

(51) Int. Cl.
*G06T 19/20* (2011.01)
*G06T 19/00* (2011.01)

(52) U.S. Cl.
CPC ........... *G06T 19/20* (2013.01); *G06T 19/006* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 9,317,971 B2 | 4/2016 | Lamb et al. | |
| 9,384,594 B2 | 7/2016 | Maciocci et al. | |
| 9,520,002 B1 * | 12/2016 | Gavriliuc | G02B 27/0103 |
| 10,127,731 B1 | 11/2018 | Ozery | |
| 10,388,075 B2 | 8/2019 | Schmirler et al. | |
| 10,403,047 B1 | 9/2019 | Comer et al. | |

(Continued)

FOREIGN PATENT DOCUMENTS

WO 2010027193 A2 3/2010

OTHER PUBLICATIONS

"WindowsAzure.Storage", Retrieved from: https://www.nuget.org/packages/WindowsAzure.Storage, Sep. 6, 2019, 4 Pages.

(Continued)

*Primary Examiner* — Robert J Craddock
(74) *Attorney, Agent, or Firm* — Alleman Hall Creasman & Tuttle LLP

(57) ABSTRACT

A computer system is provided that includes one or more processors configured to define a virtual model of a workspace that is world-locked to a three-dimensional environment by a pair of anchor points. The one or more processors are configured to adjust a fit of the virtual model to the workspace by adjusting a position of a virtual component of the virtual model relative to the pair of anchor points. The one or more processors are configured to receive telemetry data including position information indicating a location of a telemetry event relative to the pair of anchor points in the workspace, and determine a visualization model based on the virtual model of the workspace, and project telemetry data to the visualization model based on a mapping of a pair of points in the visualization model to the pair of anchor points in the virtual model.

20 Claims, 16 Drawing Sheets

(56) References Cited

U.S. PATENT DOCUMENTS

| | | | |
|---|---|---|---|
| 2008/0310707 | A1 | 12/2008 | Kansal et al. |
| 2012/0249741 | A1 | 10/2012 | Maciocci et al. |
| 2016/0026253 | A1 | 1/2016 | Bradski et al. |
| 2016/0321841 | A1 | 11/2016 | Christen et al. |
| 2016/0379408 | A1 | 12/2016 | Wright et al. |
| 2017/0076505 | A1 | 3/2017 | Gavriliuc et al. |
| 2017/0228921 | A1 | 8/2017 | Buhlmann et al. |
| 2018/0005445 | A1 | 1/2018 | Mcculloch et al. |
| 2018/0093186 | A1 | 4/2018 | Black et al. |
| 2019/0065027 | A1 | 2/2019 | Hauenstein et al. |
| 2019/0134487 | A1 | 5/2019 | Kudirka et al. |
| 2019/0340836 | A1* | 11/2019 | Lynen .................... G01C 21/20 |

OTHER PUBLICATIONS

Alcañiz, et al., "Workflow and tools to track and visualize behavioural data from a Virtual Reality environment using a light weight GIS", In Journal of SoftwareX, vol. 10, Jul. 2019, 6 Pages.

Bisson, Simon, "Introducing Azure's augmented reality: spatial anchors", Retrieved from: https://www.infoworld.com/article/3343916/introducing-azures-augmented-reality-spatial-anchors.html, Feb. 26, 2019, 5 Pages.

Cauri, "How to define metrics for augmented reality, mixed reality and virtual reality", Retrieved from: https://medium.com/©cauri/how-to-define-metrics-for-augmented-reality-mixed-reality-and-virtual-reality-58c80f12cbd4, Oct. 23, 2017, 5 Pages.

Peek, Brian, "Azure SDKs and Samples for Unity", Retrieved from: https://web.archive.org/web/20180617134512/https://github.com/BrianPeek/AzureSDKs-Unity, Jun. 17, 2018, 3 Pages.

Peek, et al., "Azure Storage SDK for Unity", Retrieved from: https://docs.microsoft.com/en-us/sandbox/gamedev/unity/azure-storage-unity, Oct. 20, 2018, 6 Pages.

Peek, Brian, "Azure Storage SDK for Unity 2017", Retrieved from: https://docs.microsoft.com/en-us/sandbox/gamedev/unity/azure-storage-unity-2017, Nov. 8, 2017, 8 Pages.

Turner, et al., "Coordinate systems", Retrieved from: https://docs.microsoft.com/en-us/windows/mixed-reality/coordinate-systems, Feb. 24, 2019, 11 Pages.

Yang, et al., "A Framework for Interactive M3 Visualization of Microscopic Traffic Simulation", In Journal of the Transportation Research Board, Apr. 2018, 17 Pages.

Zeller, et al., "Shared experiences in mixed reality", Retrieved from: https://docs.microsoft.com/en-us/windows/mixed-reality/shared-experiences-in-mixed-reality, Feb. 10, 2019, 13 Pages.

"International Search Report and Written Opinion Issued in PCT Application No. PCT/US2021/022268", dated Jun. 30, 2021, 14 Pages.

* cited by examiner

PROJECTING TELEMETRY DATA TO VISUALIZATION MODELS

BACKGROUND

With the proliferation of sensors and tracking technologies, entities have developed the ability to collect large amounts of telemetry data that record the actions and movements of workers and assets in workspaces such as warehouses. Events, such as picking up or putting down a package by an employee operating a machine such as a forklift, may be recognized by sensor systems of the warehouse, and data regarding those events may be tracked and aggregated. Many such entities operate non-stop, twenty-four hours a day, generating vast amounts of telemetry data. The sheer volume and complexity of such data can make it difficult to verify its accuracy and understand its meaning. Thus, challenges exist for improved methods to be developed for accurately capturing and visualizing such telemetry data.

SUMMARY

A computer system for projecting telemetry data to visualization models is provided. The computer system may include one or more processors configured to define a virtual model of a workspace in a real-world three-dimensional environment. The virtual model may be world-locked to the three-dimensional environment by a pair of anchor points. The one or more processors may be further configured to adjust a fit of the virtual model to the workspace by adjusting a position of a virtual component of the virtual model relative to the pair of anchor points. The one or more processors may be further configured to receive telemetry data from a telemetry device. The telemetry data may include position information indicating a location of a telemetry event relative to the pair of anchor points in the workspace. The one or more processors may be further configured to aggregate the received telemetry data in a datastore, determine a visualization model based on the virtual model of the workspace, map a pair of points in the visualization model to the pair of anchor points in the virtual model of the workspace, project the aggregated telemetry data to the visualization model based on the mapping of the pair of points in the visualization model to the pair of anchor points in the virtual model, and display the visualization model via a display of the computer system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Augmented reality head mounted display (HMD) devices may be used to augment real-world environments with data visualizations and virtual objects. Typically, the data used to augment the real-world environment is associated with position information that is defined relative to machine recognizable objects or features within the real-world environment. Thus, these data visualizations and virtual objects are locked to that specific real-world environment, and it may be difficult to appropriately translate those data visualizations and virtual objects to other environments and/or using other visualization techniques.

Figure 1:
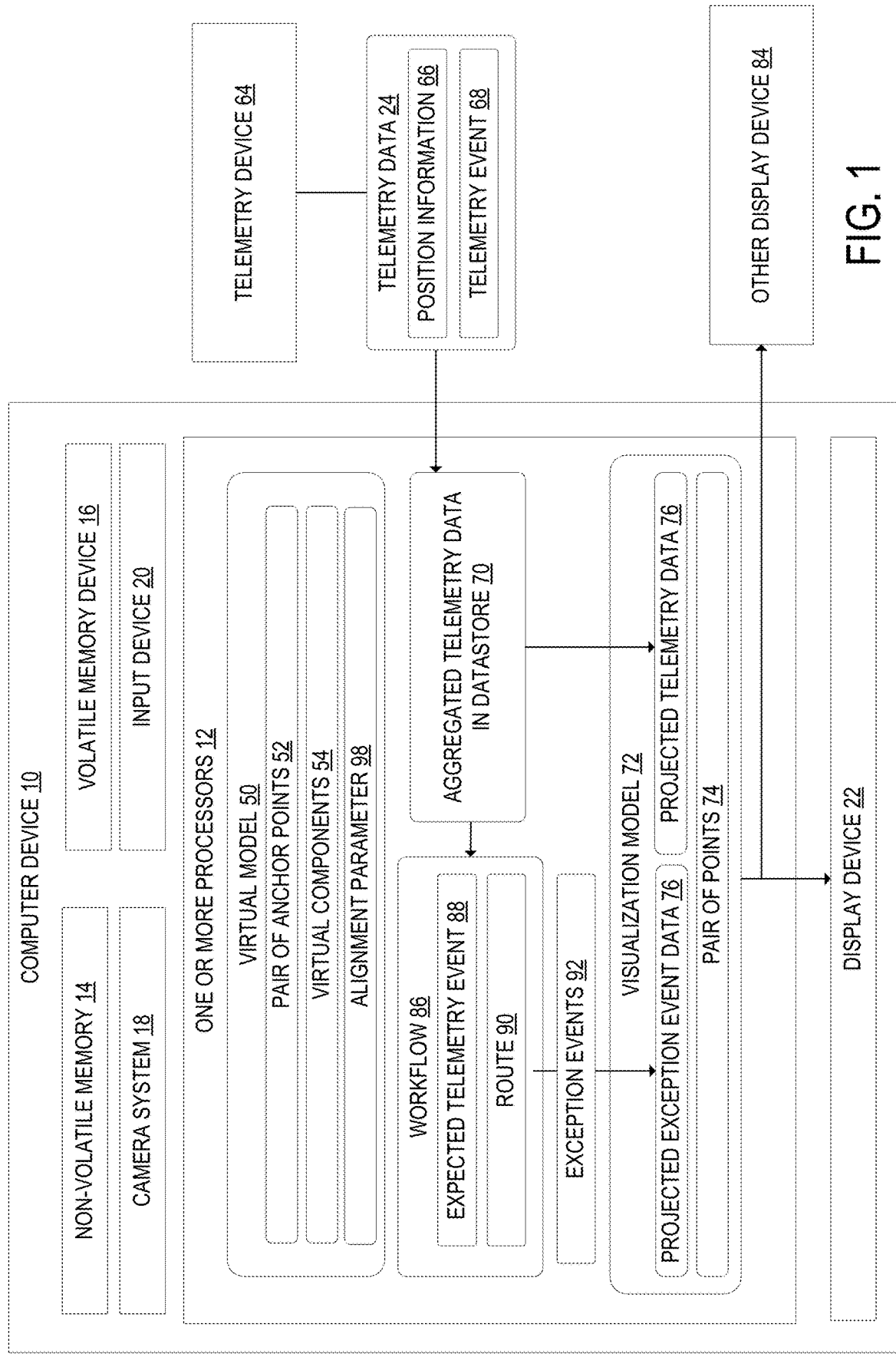
FIG. 1 shows an example computer device for determining position information for gathered telemetry data relative to a pair of anchor points in a virtual model of a workspace and projecting the telemetry data to visualization models, according to one embodiment of the present disclosure.

To address these issues, FIG. 1 illustrates a computer device 10 that is configured to determine position information for gathered telemetry data relative to a virtual anchor point. By setting corresponding anchor points in other locations or visualization models, such as a 2D visualization model for example, the telemetry data may be positioned relative to those corresponding worlds anchors and shown to the user in environments different from the real-world environment where the telemetry data was originally captured.

The computer device 10 may take the form of an HMD device, a desktop computer device, a mobile computer device, or another suitable form. The computer device 10 comprises one or more processors 12, a non-volatile memory device 14, a volatile memory device 16, a camera system 18, one or more input devices 20, and a display device 22. The camera system 18 may include a red-green-blue (RGB) camera and a depth camera configured to take RGB and depth images of a physical environment in front of the camera system 18. In one example, the camera system 18 may include one or more cameras located in different positions in the real-world physical environment. In an HMD device example, the camera system 18 may take the form of outward facing cameras on the HMD device. In one example, the computer device 10 may take the form of a server device of a computer system configured to communicate with one or more client devices. For example, the computer device 10 may take the form of a plurality of server devices of a computer system for a cloud platform configured to perform the functions and processes of the computer device 10 described herein.

The one or more input devices 20 may include, for example, a microphone device, a keyboard and mouse, a gesture input device (e.g. gestures captured by the camera system 18), accelerometer and inertial sensor devices on an HMD device, etc. The one or more input devices 20 may further include input devices having a form factor that is separate from the computer device 10. For example, the computer device 10 may be configured to communicatively couple with a hand-held barcode scanner device, an electronic system of a forklift, other computer devices, etc. Event data captured by these other input devices 20 may be sent to the computer device 10 and gathered as telemetry data 24. It should be appreciated that the example input devices 20 described above are merely exemplary, and that the computer device 10 may be configured to gather telemetry data 24 from other suitable types of input devices, such as, for example, sensor devices in a warehouse, global positioning system devices, etc.

In one example, the display device 22 may take the form of a laptop display, a desktop display, an augmented or virtual reality display, a projector display, etc. In an HMD device example, the display device 22 may take the form of a near-eye display device integrated with the HMD device. It should be appreciated that the computer device 10 and display device 22 may take other suitable form factors. In one example, the display device 22 may be a local display device that is connected to the computer device 10. In another example, the computer device 10 may take the form of a server system such as a cloud platform, and the display device 22 may be associated with a client computer device configured to communicate with the server system over a communication network such as a Wide Area Network). Further, while one computer device 10 is shown it will be appreciated that different computer devices 10 may be used during the set up phase, run time phase and visualization phases described herein, and thus one or more processors may be involved in the computational steps involved in these phases.

Figure 2:
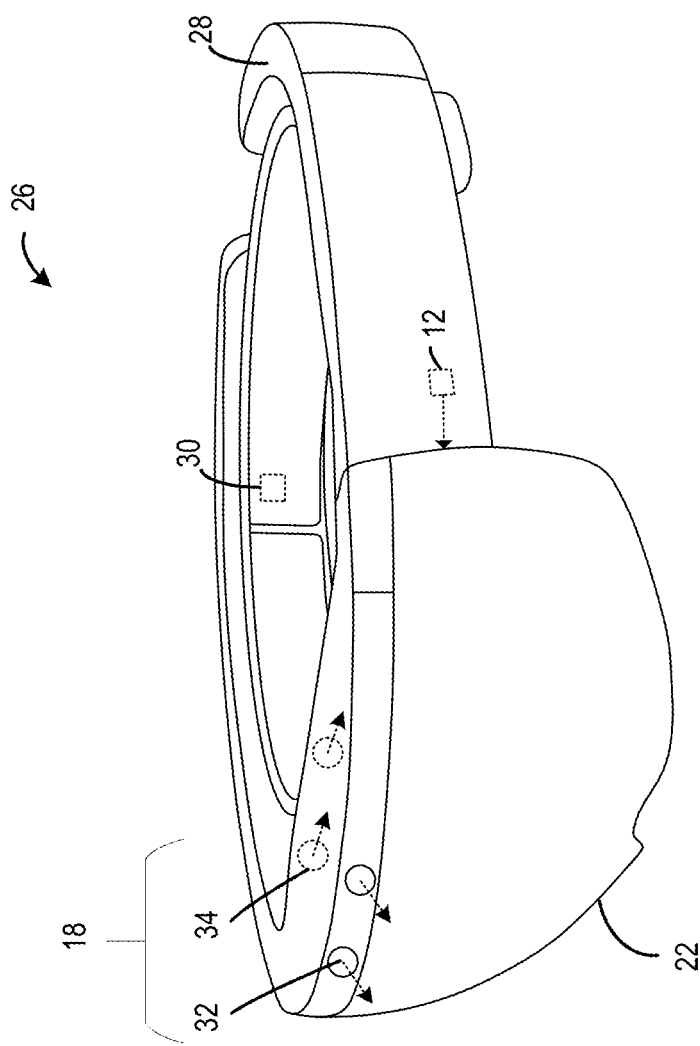
FIG. 2 shows an example head mounted display (HMD) device form of the computer device of FIG. 1.

FIG. 2 illustrates an example computer device 10 in the form of an HMD device 26. The HMD device 26 may be worn by a user according to an example of the present disclosure. In other examples, an HMD device may take other suitable forms in which an at least partially see-through display is supported in front of a viewer's eye or eyes in an augmented reality HMD device configuration.

In the example of FIG. 2, the HMD device 26 includes a frame 28 that wraps around the head of the user to position the display device 22, which takes the form of a near-eye display in this example, close to the user's eyes. The frame supports additional components of the HMD device 26, such as, for example, the one or more processors 12 and camera system 18. The one or more processors 12 includes logic and associated computer memory configured to provide image signals to the display device 22, to receive sensory signals from camera system 18, input devices 20, and to enact various control processes described herein.

Any suitable display technology and configuration may be used to display images via the display device 22. For example, in a non-augmented reality configuration, the display device 22 may be a non-see-through Light-Emitting Diode (LED) display, a Liquid Crystal Display (LCD), or any other suitable type of non-see-through display. In an augmented reality configuration, the display device 22 may be configured to enable a wearer of the HMD device 26 to view a physical, real-world object in the physical environment through one or more partially transparent pixels displaying virtual object representations. For example, the display device 22 may include image-producing elements such as, for example, a see-through Organic Light-Emitting Diode (OLED) display.

As another example, the HMD device 26 may include a light modulator on an edge of the display device 14. In this example, the display device 22 may serve as a light guide for delivering light from the light modulator to the eyes of a wearer. In other examples, the display device 22 may utilize a liquid crystal on silicon (LCOS) display.

The input devices 20 may include various sensors and related systems to provide information to the one or more processors 12. Such sensors may include an inertial measurement unit (IMU) 30. The camera system 18 may include one or more outward facing camera devices 32, and one or more inward facing camera devices 34. The one or more inward facing camera devices 34 may be configured to acquire image data in the form of gaze tracking data from a wearer's eyes.

The one or more outward facing camera devices 32 may be configured to capture and/or measure physical environment attributes of the physical environment in which the HMD device 26 is located. In one example, the one or more outward facing camera devices 32 may include a visible-light camera or RBG camera configured to collect a visible-light image of a physical space. Further, the one or more outward facing camera devices 32 may include a depth camera configured to collect a depth image of a physical space. More particularly, in one example the depth camera is an infrared time-of-flight depth camera. In another example, the depth camera is an infrared structured light depth camera.

Data from the outward facing camera devices 32 may be used by the one or more processors 12 to generate and/or update a three-dimensional (3D) model of the physical environment. Data from the outward facing camera devices 32 may be used by the one or more processors 12 to identify surfaces of the physical environment and/or measure one or more surface parameters of the physical environment. The one or more processors 12 may execute instructions to generate/update virtual models for a real-world environment that may be displayed on display device 22, identify surfaces of the physical environment, and recognize objects based on the identified surfaces in the physical environment, as will be described in more detail below.

In augmented reality configurations of HMD device 26, the position and/or orientation of the HMD device 26 relative to the physical environment may be assessed so that augmented-reality images may be accurately displayed in desired real-world locations with desired orientations. As noted above, the one or more processors 12 may execute instructions to generate a 3D model of the physical environment including surface reconstruction information, which may include generating a geometric representation, such as a geometric mesh, of the physical environment that may be used to identify surfaces and boundaries between objects, and recognize those objects in the physical environment based on a trained artificial intelligence machine learning model. Additionally, as will be discussed in more detail below, the HMD device 26 may be configured to determine the position and/or orientation of the HMD device 26 and/or telemetry events relative to a pair of anchor points that may be set and placed within a real-world environment. The HMD device 26 may determine position and orientation data based on the IMU 30, the constructed 3D model of the real-world environment, image processing performed on images captured by the camera system 18, and other types of data accessible by the HMD device 26.

In both augmented reality and non-augmented reality configurations of HMD device 26, the IMU 30 may be configured to provide position and/or orientation data of the HMD device 26 to the one or more processors 12. In one implementation, the IMU 30 may be configured as a three-axis or three-degree of freedom (3DOF) position sensor system. This example position sensor system may, for example, include three gyroscopes to indicate or measure a change in orientation of the HMD device 26 within 3D space about three orthogonal axes (e.g., roll, pitch, and yaw). The orientation derived from the sensor signals of the IMU may be used to display, via the display device 22, one or more holographic images with a realistic and stable position and orientation.

In another example, the IMU 30 may be configured as a six-axis or six-degree of freedom (6DOF) position sensor system. Such a configuration may include three accelerometers and three gyroscopes to indicate or measure a change in location of the HMD device 26 along three orthogonal spatial axes (e.g., x, y, and z) and a change in device orientation about three orthogonal rotation axes (e.g., yaw, pitch, and roll). In some implementations, position and orientation data from the outward facing camera devices 32 and the IMU 30 may be used in conjunction to determine a position and orientation (or 6DOF pose) of the HMD device 26.

In some examples, a 6DOF position sensor system may be used to display holographic representations in a world-locked manner. A world-locked holographic representation appears to be fixed relative to one or more real world objects viewable through the HMD device 24, thereby enabling a wearer of the HMD device 24 to move around a real world physical environment while perceiving a world-locked hologram as remaining stationary in a fixed location and orientation relative to the one or more real world objects in the physical environment. In another example, the HMD device 24 may be configured to display virtual objects and data visualizations at positions and orientations defined relative to a pair of anchor points that may be set for the real-world environment.

Figure 3:
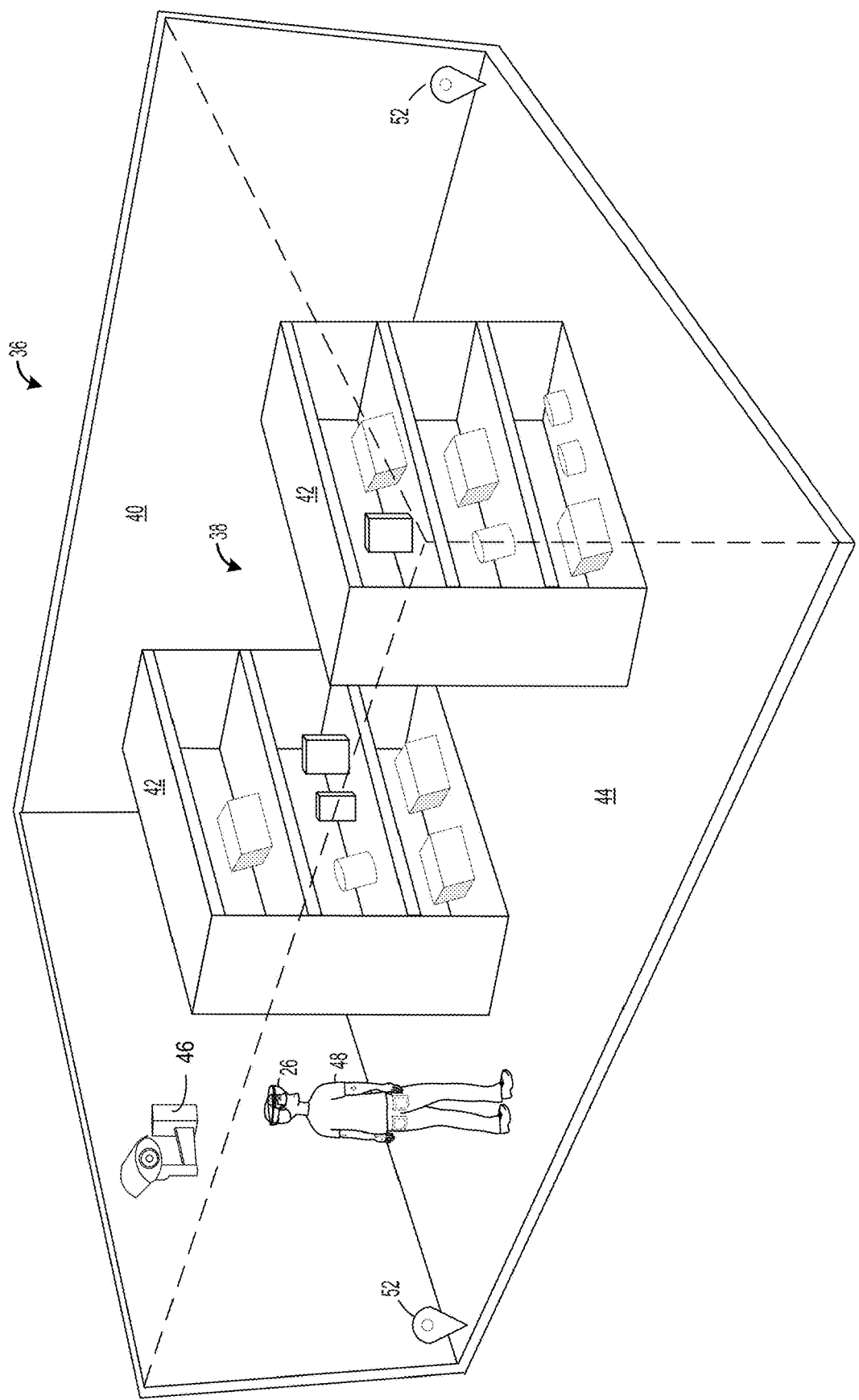
FIG. 3 shows a view of an example workspace and a pair of anchor points for the computer device of FIG. 1.

FIG. 3 illustrates an example real-world environment 36 that includes one or more walls 40, one or more shelves 42, a floor 44, etc. The boundaries of the real-world environment 36 may form a workspace 38 within which the HMD device 26 may be configured to gather telemetry data 24. As discussed above, the HMD device 26 may be configured to communicate with input devices to gather telemetry data from those input devices 20. In the example real-world environment 36 of FIG. 3, the workspace includes a warehouse camera device 46 configured to capture images of the workspace that may be processed to extract telemetry data. Other types of input devices may include, for example, a scanner device held by a user 48, a computer system integrated with a forklift, etc.

In a set-up phase, the one or more processors 12 of the computer device 10 may be configured to define a virtual model 50 of the workspace 38 in the real-world three-dimensional environment 36. The virtual model 50 may be world-locked to the three-dimensional environment 36 by a pair of anchor points 52. The pair of anchor points 52 are virtual points that may be set at machine recognizable positioned within the workspace 38, such as, for example, corners of the workspace. However, it should be appreciated that any recognizable feature within the workspace 38 may be used to define positions for the pair of anchor points 52. The positions of the anchor points 52 may be controlled by the user 48 of the computer device 10 during the set-up phase.

Figure 4:
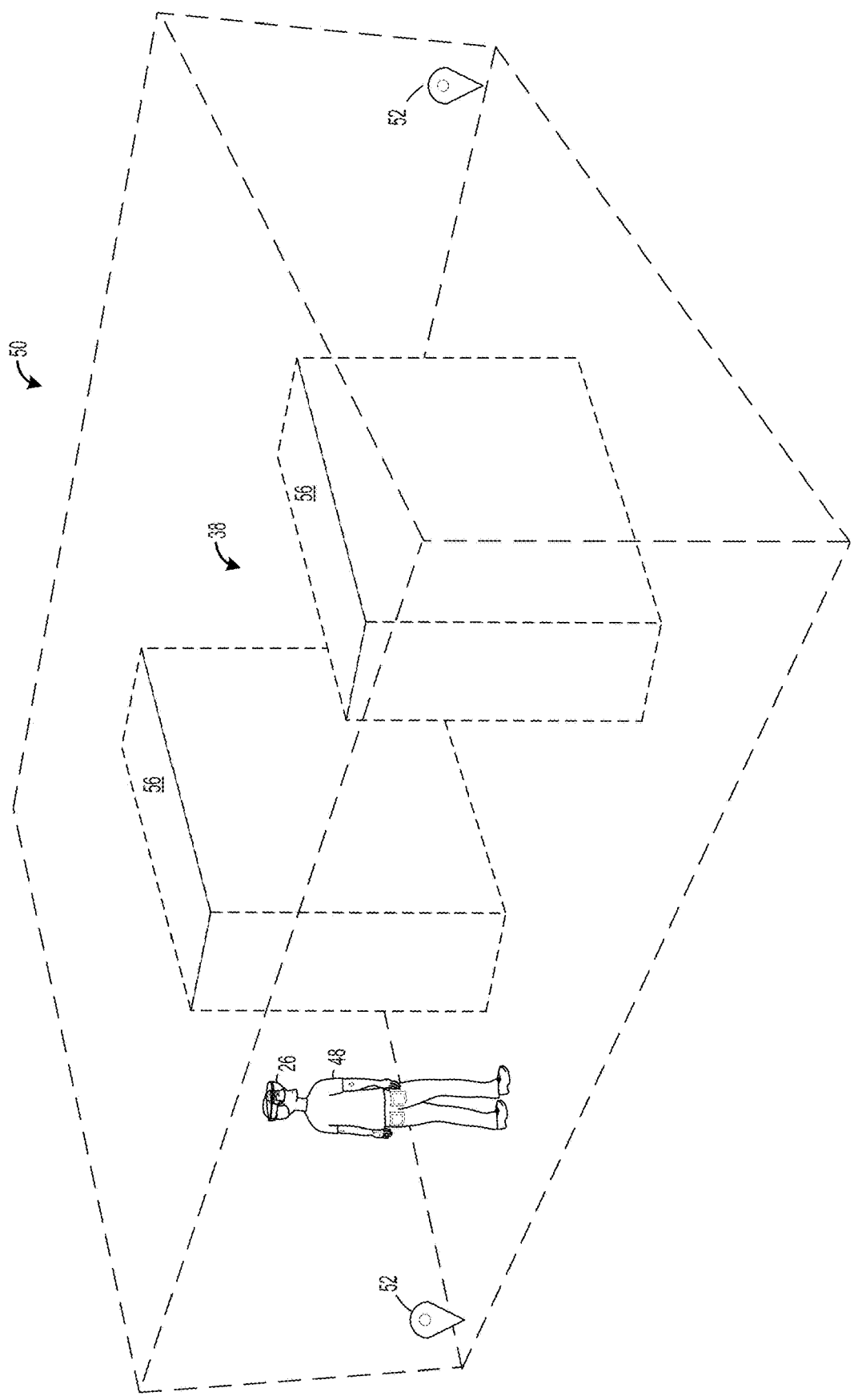
FIG. 4 shows an example virtual model generated for the example workspace by the computer device of FIG. 1.

FIG. 4 illustrates an example virtual model 50 defined for the workspace 38 of the real-world environment 36 shown in FIG. 3. The virtual model 50 may be defined to include one or more virtual components 54 such as, for example, virtual walls, virtual floors, other types of virtual boundaries, one or more virtual objects 56, etc. The virtual components 54 may be positioned relative to the pair of anchor points 52. As described herein, the pair of anchor points 52 may be placed in opposite corners, and thus may form a 2D cartesian coordinate system having an origin point at one of the anchor points 52. Length and width may be defined based on the distance between the pair of anchor points 52. The virtual components 54 of the virtual model 50 may then be positioned relative to the cartesian coordinate system defined by the pair of anchor points.

In one example, the virtual model 50 may be defined based on user input received from the user 48. For example, the computer device 10 may provide an interface that provides functions for the user 48 to generate virtual objects 56 and adjust characteristics of those virtual objects such as dimensions, size, etc. These virtual objects 56 and other virtual components 54 may be placed at positions within the virtual model 50. The computer device 10 may be further configured to adjust a fit of the virtual model 50 to the workspace 38 by adjusting a position of a virtual component 54 of the virtual model 50 relative to the pair of anchor points 52.

Figure 5:
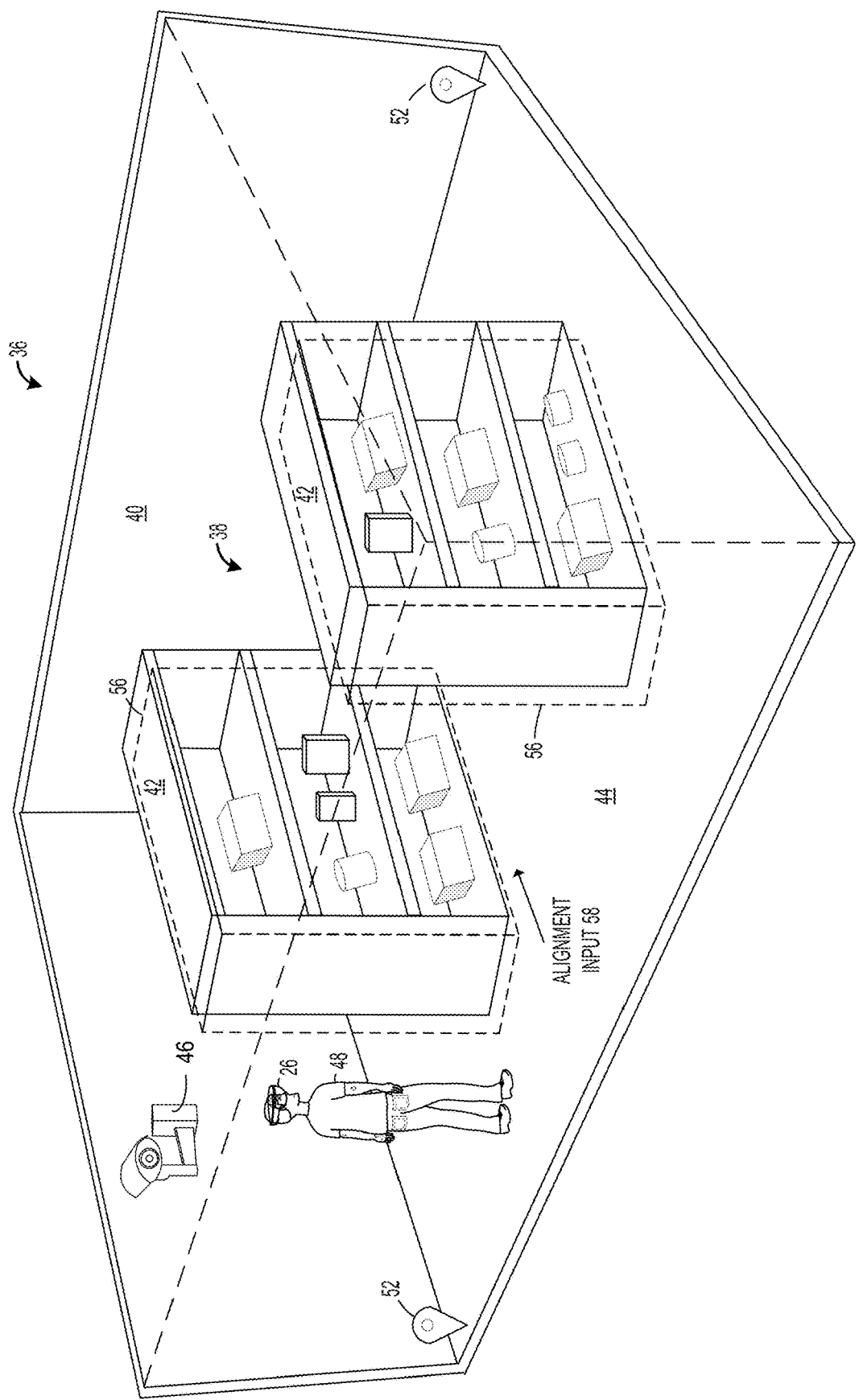
FIG. 5 shows an example fit adjustment of the virtual model generated for the example workspace by the computer device of FIG. 1.

In the example shown in FIG. 5, the display 22 of the HMD device 26 may display the virtual model 50 superimposed on the real-world environment 36 in an augmented reality configuration. The virtual model 50 including each virtual component 54 may be displayed at positions defined relative to the pair of anchor points 52. As the virtual model 50 is a model of the workspace 38, the virtual components 54 such as virtual objects 56 are intended to line up with the corresponding real-world objects. In one example, the fit of the virtual model 50 is aligned to the workspace 38 by use of an alignment parameter 98, such as, for example, position, size, geometry, scale, etc. These alignment parameters 98 may be adjusted via alignment inputs. In one example, the alignment parameters 98 may be adjusted programmatically to align the virtual model 50 with the workspace 38. In another example, the alignment parameters 98 may be adjusted via user input, which will be described in more detail below. After adjusting the virtual model 50, the computer device 10 may be further configured to store a value for the adjusting in the alignment parameter 98 to thereby align the fit of the virtual model to the workspace.

In the example illustrated in FIG. 5, the virtual objects 56 are intended to line up with the corresponding shelve objects 42 in the workspace 38. However, as illustrated, the virtual model 50 may not have a perfect fit. For example, the user 48 may not have accurately positioned the generated virtual objects 56 during the set-up phase for the virtual model 50. By displaying the virtual model 50 superimposed on the workspace 38, the user 48 may identify positional or other types of discrepancies between the virtual model 50 and the corresponding workspace 38. By entering a user input, such as, for example, a gesture input to grab and move a virtual object 56, the user 48 may adjust the fit of the virtual model 50 to the workspace 38. In the example illustrated in FIG. 5, the user may enter an alignment input 58 to move a position of the virtual object 56 backwards to provide an improved fit with the corresponding shelf 42. The new position and/or orientation of the virtual component 54 may then be defined relative to the pair of anchor points 52.

In the examples discussed above, the virtual model 50 was defined based on user input to generate and adjust virtual components 54 of the virtual model 50. However, it should be appreciated that the computer device 10 may use other techniques to define the virtual model 50. In one example, the one or more processors 12 of the computer device 10 may be configured to scan the workspace 38 in the real-world three-dimensional environment 36 via the camera system 18. The computer device 10 may then perform Simultaneous Localization and Mapping (SLAM) techniques for surface reconstruction of the workspace 38. Using SLAM techniques, the computer device 10 is configured to generate the three-dimensional virtual model 50 of the workspace 38 including one or more virtual objects 56 that correspond with one or more real objects in the workspace 38. The generated virtual model 50 may be defined relative to the pair of anchor points 52 set for the workspace 38, and the one or more virtual objects 56 may be generated to have positions relative to the pair of anchor points 52.

Figure 6:
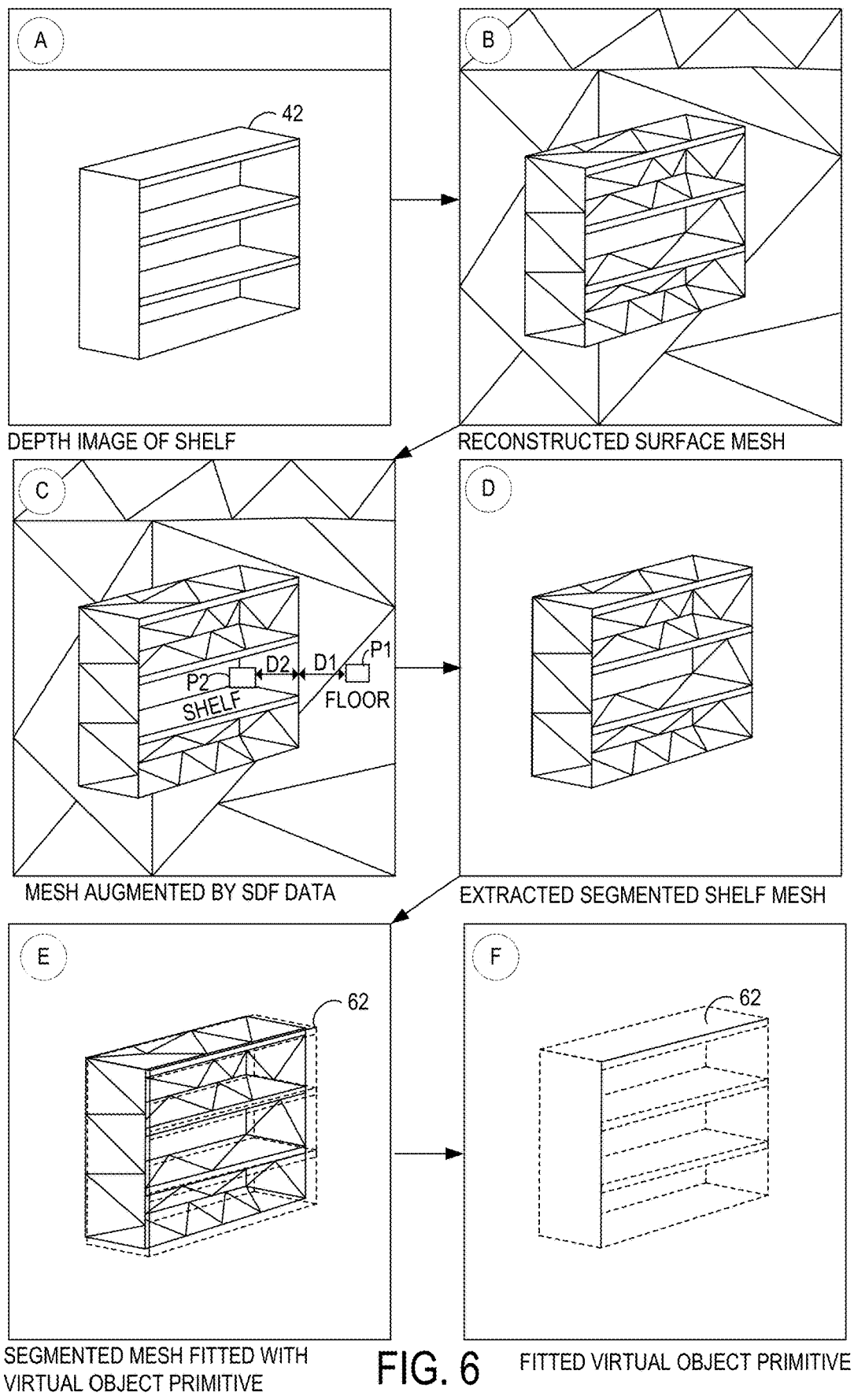
FIG. 6 shows an example surface reconstruction process for generating virtual components of a virtual model that correspond to real-world objects of the workspace for the computer device of FIG. 1.

FIG. 6 illustrates an example surface reconstruction process to generate a fitted object primitive for the one or more virtual objects 56 based on image data captured by the camera system 18. FIG. 6 at (A) shows a portion of an example depth image captured by the camera system 18 centered at a real object in the real-world environment 36, which is a shelf 42 in the illustrated example. The depth image is processed by surface reconstruction techniques to generate a geometric representation of the real-world physical environment 36 captured by the image. FIG. 6 at (B) shows an example geometric representation in the form of a surface mesh.

In one example, scene data captured by the camera system 18 including the depth image is processed by an artificial intelligence machine learning model such as a Fully Convolutional Network (FCN) to produce Signed Distance Field (SDF) data which indicates, for each pixel, a distance to a nearest instance boundary and an object label of the type of object that the pixel likely lies upon. In the example illustrated in FIG. 6 at (C), a first pixel P1 in the SDF may be tagged by the FCN with a distance D1 to the nearest boundary of the scene data near the shelf 42 of the real-world environment 36 in FIG. 3, and may be tagged with a floor object label. A second pixel P2, which lies on the shelf 42, may be tagged with a distance D2 to the same boundary of the scene data (e.g. edge of the shelf) having an opposite sign to the distance D1. Further, the pixel P2 may be tagged with a shelf object label. In this manner, each pixel in the SDF generated for the scene data 36 may be tagged with a distance to the nearest instance boundary and an object label that corresponds to a virtual object model stored in an object library. The object library may, for example, include adjustable object primitives for a variety of object types, such as, for example, tables, shelves, floors, walls, boxes, etc.

FIG. 6 at (C) shows the surface mesh from FIG. 6 at (B) being augmented with the SDF data produced as discussed above. For example, the voxels of the surface mesh may be augmented by being tagged with the object label of the pixel that lies on that voxel from the SDF data. After augmentation, the collection of voxels from the surface mesh that have been tagged with a shelf object label may be extracted/extruded from the surface mesh of the physical environment, as shown at FIG. 6 at (D).

The one or more processors 12 may then generate a virtual shelf object primitive 62 from the model library discussed above, which may include predetermined surfaces, geometries, characteristics, and predetermined methods of transforming the primitive to handle movement, rotation, etc. One or more object parameters of the virtual shelf object may be set/changed to fit the virtual table object primitive 62 to the geometric characteristics of the extruded set of voxels tagged with a shelf object label. FIG. 6 at (E) illustrates an example of fitting a virtual shelf object primitive 62 to the geometric characteristics of the extracted table mesh shown in FIG. 6 at (D).

The fitted virtual shelf object shown in FIG. 6 at (F) may then be defined with a position and orientation relative to the pair of anchor points 52 of the workspace 38. The surface reconstruction and model generation process described above may be performed for each real-world object in the workspace 38, such as, for example, each shelf object 42 shown in FIG. 3. In this manner, the one or more processors 12 may generate the virtual model 50 based on scans of the workspace 38 via the camera system 18. Similarly to the user generated example, the virtual model 50 generated by the surface reconstruction and object generation process described above may not have a perfect fit with the workspace 38. In one example, the virtual model 50 may be displayed to the user 48 superimposed on the workspace 38 such that the user may identify potential fit issues.

Figure 7:
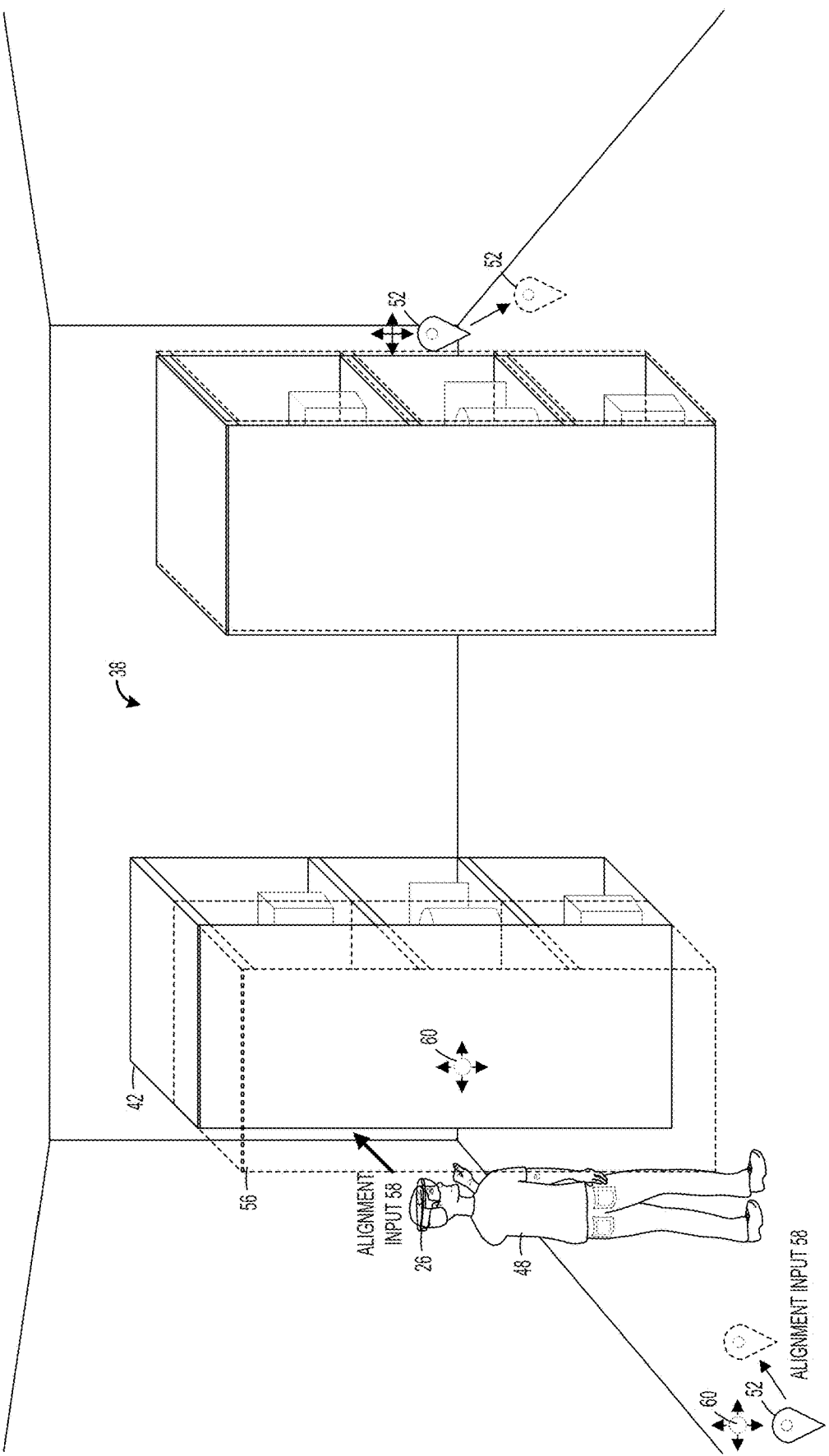
FIG. 7 shows an example alignment input entered by a user to align the virtual model of a workspace defined by the computer device of FIG. 1.

Turning to FIG. 7, after the virtual model 50 and internal virtual objects 56 have been generated, the user may then enter an alignment input 58 to align one of the virtual objects 56 with a corresponding real object 42 in the workspace 38. For example, the user may align internal components of the virtual model 50 to align with the real-world environment. As a specific example, the alignment input 58 may move a wall virtual object or shelf virtual object to a new position defined relative to the pair of anchor points 52. The alignment input may take any suitable form, such as, for example, a grab and move gesture input, a select and drag input, etc. After receiving the alignment input, the one or more processors 12 may adjust a position of the virtual object 56 relative to the pair of anchor points 52 based on the user alignment input 58. After adjusting the fit of the virtual model 50 based on the alignment input, the one or more processors 12 may be further configured to store a value for the adjusting in the alignment parameter 98 to thereby align the fit of the virtual model 50 to the workspace 38.

FIG. 7 illustrates an example grab and move gesture input entered by the user 48. As shown, the user may extend a hand toward the virtual object 56 and grasp a portion of the virtual object 56. The outward facing cameras 32 of the HMD device 26 may capture images of the user's gesture. After processing the captured images, the HMD device 26 may recognize the user's gesture as a grab gesture input, and may further determine that the user's grab gesture input overlaps with a portion of the virtual object 56. In this manner, the HMD device 26 may determine that the user has entered an input to grab the virtual object 56. Next, the user may then move the grabbing hand in a target direction. Based on images captured by the outward facing cameras 32, the HMD device 26 may determine the direction that the user's hand is moving and apply a corresponding movement to the grasped virtual object 56. The combination of grab and move gesture inputs detected by the HMD device 26 may form the alignment input 58 that moves the grasped virtual object 56 backwards in the illustrated direction to be aligned with the corresponding real object 42.

It should be appreciated that the alignment input 58 is not limited to grabbing and moving gesture inputs entered by a user 48, but may also be entered via other suitable types of gesture inputs such as a pushing gesture, swiping gesture, pointing gesture, etc. Additionally, in some examples, a virtual control point 60 may be displayed on the virtual object 56 during an alignment phase. The user 48 may direct gesture inputs to the virtual control point 60 to enter alignment inputs for the associated virtual object 56.

Additionally, during alignment of the virtual model 50, the user 48 may also enter an alignment input 58 to move the pair of anchor points 52. Alignment inputs 58 may be directed toward the pair of anchor points 52 in a similar manner as described above. For example, the user 46 may grasp the displayed virtual anchor point and move the anchor point to a new position in the workspace 38. In another example, the user may direct alignment input 58 to a virtual control point 60 associated with the anchor point 52. Thus, the user 48 may move the pair of anchor points 52 to define a target area that the virtual model 50 will cover. For example, there may be areas of the workspace 38 that the user 48 does not want to be modeled, such as an office, a bathroom, a breakroom, etc. Using the alignment input 58 described above, the user 48 may align the virtual model 50 and one or more internal components including virtual objects 56 to be aligned with the real-world environment.

Turning back to FIG. 1, the computer device 10 defines the virtual model 50 for the workspace 38 in a set-up phase as discussed above. The virtual model 50 is defined relative to the pair of anchor points 52 that may be set by a user 48 of the computer device 10. The virtual model 50 includes virtual components 54, such as, for example, virtual objects 56 that are fit to corresponding real objects of the workspace 38. As discussed above, using data from the IMU 30, images captured by the camera system 18, GPS data, and other types of data, the computer device 10 that may take the form of an HMD device 26 may track a current position and orientation of the user relative to the pair of anchor points 52 of the virtual model 50.

In a runtime phase, the computer device 10 may be configured to receive telemetry data 24 from a telemetry device 64. The telemetry device 64 may take the form of the HMD device 26. In another example, the telemetry device 64 may take the form of one or more input devices 20 separate from the HMD device 26, such as, for example, a scanner device configured to communicate with the computer device 10. As another example, the telemetry device 64 may take the form of a computer system integrated with a forklift operating in the workspace 38. As yet another example, the telemetry device 64 may take the form of a warehouse camera system or warehouse sensor system deployed within the workspace 38. It should be appreciated that the telemetry device 64 is not limited to the examples described above, and may take other suitable forms.

The telemetry data 24 may include position information 66 indicating a location of a telemetry event 68 defined relative to the pair of anchor points 52 in the workspace 38. The received telemetry data 24 may be aggregated in a datastore 70 on the computer device 10. In one example, the position information 66 for a telemetry event 68 received from a telemetry device 64 may include GPS or another type of position information. In this example, the one or more processors 12 may compare the position information 66 to the virtual model 50 of the workspace 38 to determine corresponding position information that is defined relative to the pair of anchor points 52.

The telemetry event 68 may take the form of an event that occurs within the workspace 38, such as, for example, an incident event, a pick event, a put event, a reroute event, a forklift event, a notification event, a scan event, an error event, and a user event. An incident event may include potential incidents that may occur in the workspace 38, such as, for example, a broken box, a spill, a fire, etc. A pick event may occur when a tracked object/package is picked from a shelf of the workspace 38. A put event may occur when a tracked object/packed is put onto a shelf of the workspace 38.

A reroute event may occur when a user in the workspace 38 deviates from a planned route. For example, the user may be driving a forklift along a predefined route to reach a target package in the workspace 38. While following that route, the user may determine that the route to the location of the target package is blocked or otherwise inaccessible. The user may then be rerouted around the location of the block. The location that the user was rerouted may be sent as a telemetry event 68. As another example of rerouting telemetry events, the user 48 may change a current route and enter a custom rerouting telemetry event, or may be rerouted to a new target package.

A forklift event may include events related to forklift use such as a start and finish event, a wait event, a pulldown event during operating of the forklift, etc. A notification event may include notifications that are presented to users working within the workspace 38, such as, for example, a notification of a new work request, a notification that a package is ready for pulldown, a notification of a wrong scan during a pick/put event, etc.

A scan event may include events related to scanning packages for tracking purposes during pick/put events. For example, scan events may include a type of item being scanned, a location of the item being scanned, a general error event that occurring during scanning, a wrong item event where the user scanned an incorrect item for the pick/put event, a wrong location event where the item was at an incorrection location when it was scanned, etc.

The telemetry events 68 may also include general error events that may occur in the workspace 38, and user events related to user accounts associated with the computer device 10. For example, a user event may occur when a user logs into or out of an account associated with the computer device 10.

It should be appreciated that the example telemetry events 68 described above are merely exemplary, and that the telemetry events 68 that may be aggregated by the computer device 10 are not limited to the examples described herein. For example, the telemetry events described above are related to a warehouse workspace example. It should be appreciated that other types of workspaces such as an office, an art studio, a home workspace, etc., may have different types of telemetry events 68 that are suitable for those types of workspaces.

After the telemetry data 24 has been aggregated, the computer device 10 may present the telemetry data 24 using a visualization model 72. In a visualization phase, the one or more processors 12 may be configured to determine a visualization model 72 based on the virtual model 50 of the workspace 28. The visualization model 72 may take the form of a two-dimensional visualization model, a three-dimensional augmented reality model, or another type of model for visualization the aggregated telemetry data 24 gathered by the computer device 10. As described herein, the aggregated telemetry data 70 includes position information 66 for telemetry events 68 that is defined relative to the pair of anchor points 52 in the workspace 38. Thus, to present the aggregated telemetry data via the visualization model 72, the one or more processors 12 may be configured to map a pair of points 74 in the visualization model 50 to the pair of anchor points 52 in the virtual model 50 of the workspace 38. The pair of points 74 in the visualization model 72 may, for example, be set by the user during generation of the visualization model 72.

The one or more processors 12 of the computer device 10 may be further configured to project the aggregated telemetry data to the visualization model 72 based on the mapping of the pair of points 74 in the visualization model 72 to the pair of anchor points 52 in the virtual model 50. That is, the position information for the telemetry data 24 may be mapped to corresponding positions in the visualization model 72 based on the mapping between the pair of anchor points 52 in the virtual model 50 and the pair of points 74 in the visualization model 72. The projected telemetry data 76 may then be displayed in the visualization model 72 via a display device 22.

Figure 8:
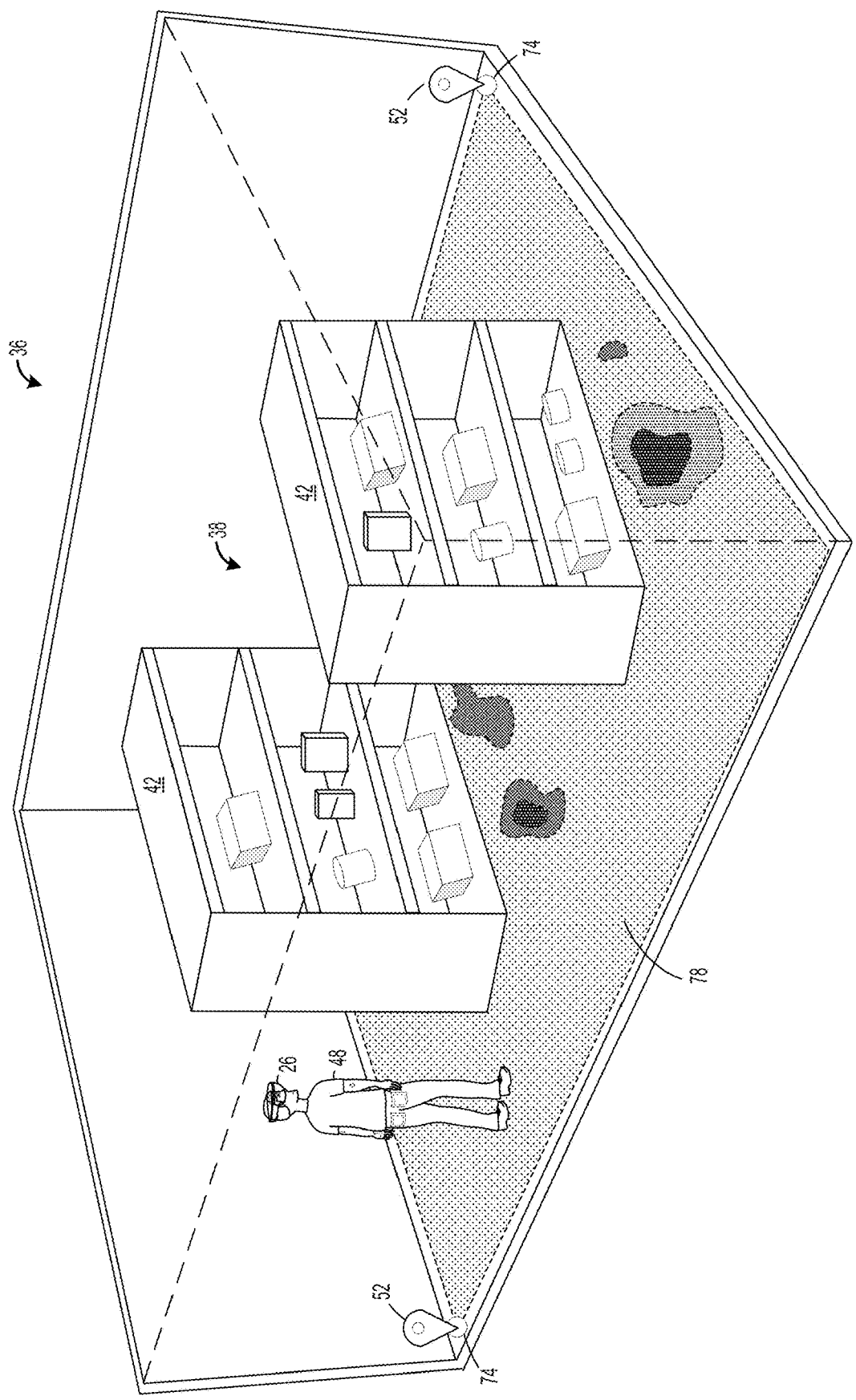
FIG. 8 shows an example visualization model and a pair of points used to project the telemetry data aggregated by the computer device of FIG. 1.

In one example, the visualization model 72 is a three-dimensional augmented reality model that may be displayed via a near-eye display device of the HMD device 26. FIG. 8 illustrates an example three-dimensional augmented reality model 78 that is an augmented reality heat-map of package pick and put telemetry events. In this specific example, the augmented reality model 78 is being shown within the workspace 38 where the telemetry data 24 was captured. Thus, in this example, the visualization model 72 in the augmented reality form may have a pair of points 74 that are located at the same positions in the real-world as the pair of anchor points 52. The aggregated telemetry data for the pick and put events may by projected to the visualization model 72 based on the mapping between the pair of anchor points 52 and the pair of points 74. In this specific example, the projected telemetry data in the visualization model 72 will be displayed at the same positions as when the telemetry data was captured due to the visualization model 72 and the virtual model 50 having the same scale.

Figure 9:
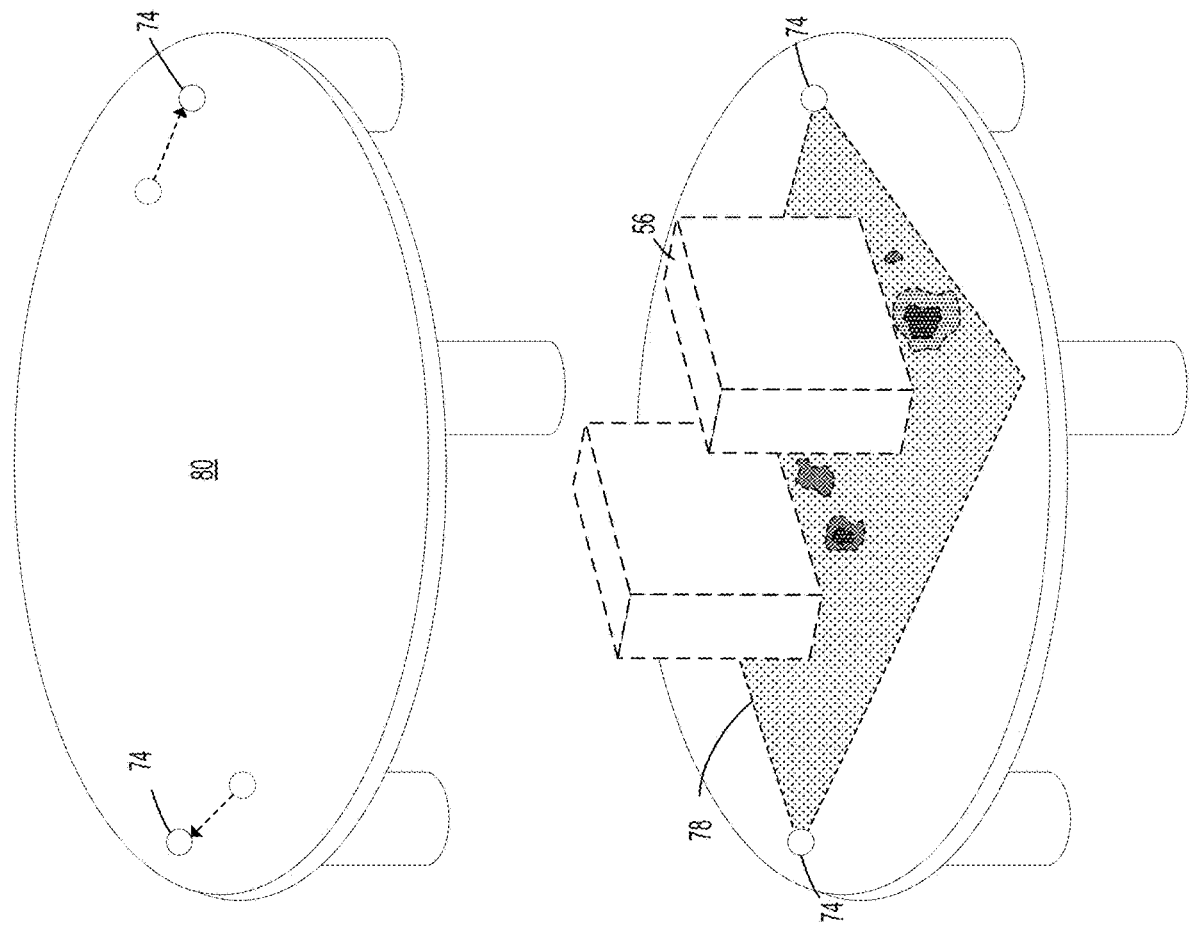
FIG. 9 shows a table that a visualization model upon which is visualization model will be superimposed by the computer device of FIG. 1.

However, in another example, the scale of the visualization model 72 may differ from the virtual model 50 of the workspace. FIG. 9 illustrates an example where the user 48 is intending to view the visualization model 72 on top of a table 80, which has a different scale of dimensions including length and width compared to the workspace 38 of the real-world environment 36 that the telemetry data 24 was captured within. The user 48 may define a pair of points 74 for the visualization model 72, which is an augmented reality model 78 in this example. In the illustrated example, the user 48 places a pair of points 74 on the table 80 where the model will be displayed. The user may also move the pair of points 74 around via inputs until a desired position for the pair of points 74 is reached. It should be appreciated that the distance between the pair of points 74 in FIG. 9 is different than the distance between the pair of anchor points 52 defined for the virtual model 50 of the workspace 38. The one or more processors 12 of the computer device 10 may be configured to determine a scaling difference between the pair of points 74 in the visualization model 78 and the pair of anchor points 52 of the virtual model 50 of the workspace 38. Next, the one or more processors 12 of the computer device 10 may be configured to map the position information 66 of the aggregated telemetry data 24 to the pair of points 74 of the visualization model 72 based on the scaling difference.

Figure 10:
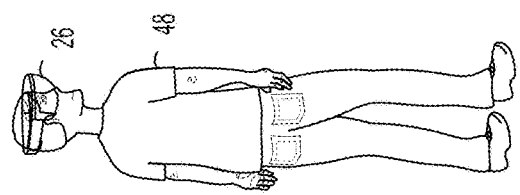
FIG. 10 shows an example augmented reality visualization model that is displayed as being located on top of the table by the computer device of FIG. 1.

That is, similarly to the pair of anchor points 52, the pair of points 74 of the visualization model 72 may define a cartesian coordinate system. The position information 66 of the telemetry data 24 may be mapped to the cartesian coordinate system defined by the pair of points 74 of the visualization model 72 such that the relative positions are the same as in the cartesian coordinate system defined by the pair of anchor points 52. FIG. 10 shows a result of the mapping process where the visualization model 78 and the projected telemetry data 76 are scaled to the pair of points 74 set by the user 48. In the illustrated example, a heat map of the pick and put event telemetry data is displayed within the visualization model 72 in the form of an augmented reality model 78. Additionally, as illustrated in FIG. 10, the visualization model 72 may further include the virtual components such as virtual objects 56 of the virtual model 50. As discussed above, position information and dimensions of the virtual model 50 are configured relative to the pair of anchor points 52. Similarly to the telemetry data 24, the virtual model 50 may also be mapped to the pair of points 74 of the visualization model 72, and thus scaled appropriately.

In the examples described above, the visualization model 72 took the form of a three-dimensional augmented reality model that may be displayed via a near-eye display of an HMD device worn by a user. However, the visualization model 72 may take other suitable forms, such as, for example, a two-dimensional visualization model 82 that may be displayed using a desktop display device, a laptop display device, or another type of display device for two-dimensional images.

Figure 11:
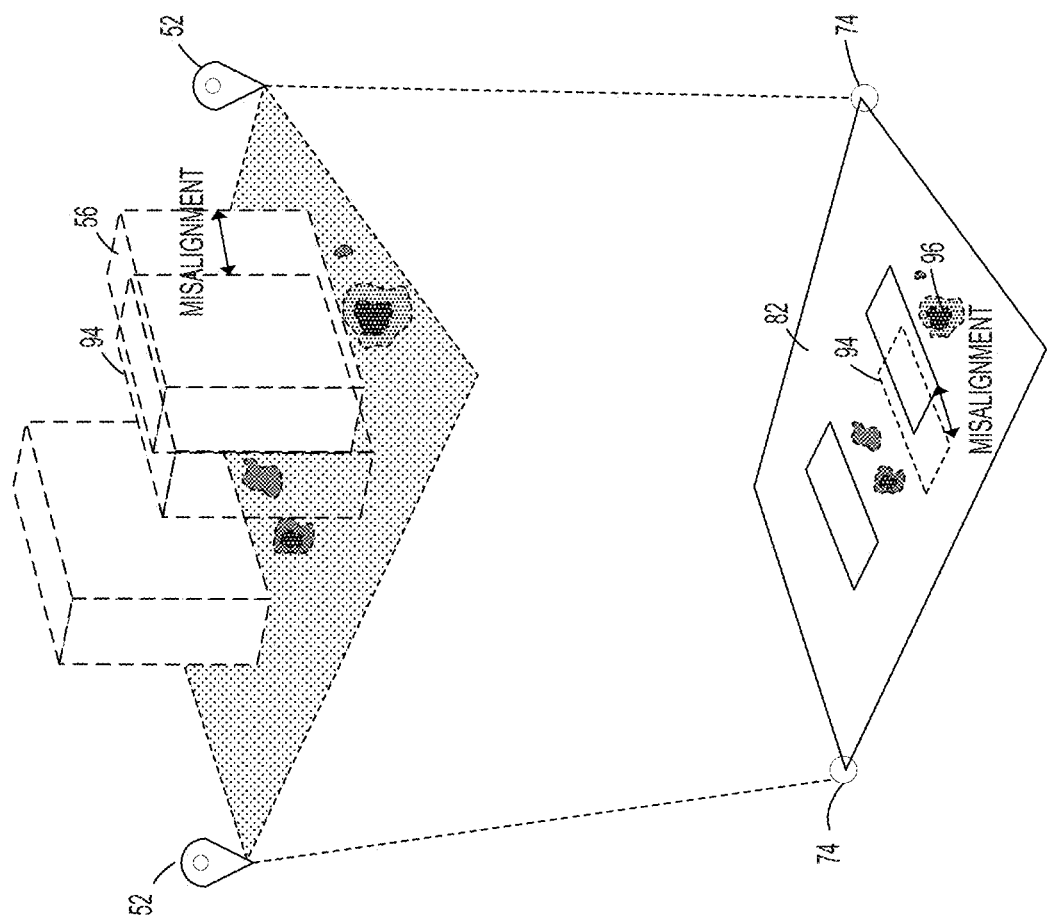
FIG. 11 shows an example of projecting aggregated telemetry data and the virtual model to a two-dimensional visualization model using the computer device of FIG. 1.

In the example illustrated in FIG. 11, the one or more processors 12 may be configured to project the virtual model 50 of the workspace 38 and the aggregated telemetry data 24 to the two-dimensional visualization model 82 based on the mapping of the pair of points 74 in the visualization model 82 to the pair of anchor points 52 in the virtual model 50.

The virtual model 50 may typically have three-dimensional position data that is defined relative to the pair of anchor points 52. To generate the two-dimensional visualization model 82, the one or more processors 12 may be configured to project the virtual model 50 down to a two-dimensional plane of the visualization model, and thus eliminate a z-axis of the position information for the virtual model 50. In this manner, a two-dimensional representation of virtual components 54 of the virtual model 50 may be presented in the two-dimensional visualization model 82. Similarly as discussed above, the x-axis and y-axis positional information may be mapped to the cartesian coordinate system defined by the pair of points 74 set for the visualization model such that relative positions between telemetry data 24 and virtual components 54 of the virtual model remain the same.

FIG. 11 also shows an example of an effect that misalignment of the virtual model 50 may have on the visualization model 72. For example, if the virtual model 56 shown in FIG. 11 was misaligned with the corresponding real-world object and instead positioned at the location of misaligned object 94, then the projection of that misaligned object 94 to the visualization model 72 would also be misaligned. However, as the position information for telemetry data 24 may be captured based on, for example, GPS data, positioning data of the HMD device 26, etc., the telemetry data 24 may have correct position information relative to the pair of anchor points 52. Thus, the resulting visualization module 72, such as the two-dimensional model 82 shown in FIG. 11, may have correct projections of the telemetry data but incorrect projections of the misaligned virtual object 94. Consequently, the misalignment in the visualization model 72 may cause misinterpretations of the data by users.

For example, the pick/put heat map shown in FIG. 11 may be useful to identify locations in the workspace where pick/put events are most frequent and may thus potentially cause bottlenecks in workflow, or identify the specific items that are most frequently picked/put in the workspace so that those items may be moved to easier to reach locations in the workspace 38. However, if the virtual model 50 has misalignments, such as the misaligned virtual object 94, then the heat map data for pick/put events may potentially be misaligned with the locations on the virtual objects where those pick/put events occur. That is, a user viewing the two-dimensional heat-map visualization model 82 from FIG. 11 may incorrectly identify that a hotspot 96 of pick/put events are occurring for items on a right side of a shelf corresponding to the misaligned virtual object 94, when in reality the hotspot 96 of pick/put events has occurred at a middle of the shelf. In this manner, misalignments in the virtual model 50 may potentially cause misinterpretations of the telemetry data represented in the visualization models 72 displayed to users. The alignment process described above with reference to FIG. 7 may provide the potential benefits of improving accuracy of the visualization models and reducing potential misinterpretations of the telemetry data 24.

Figure 12:
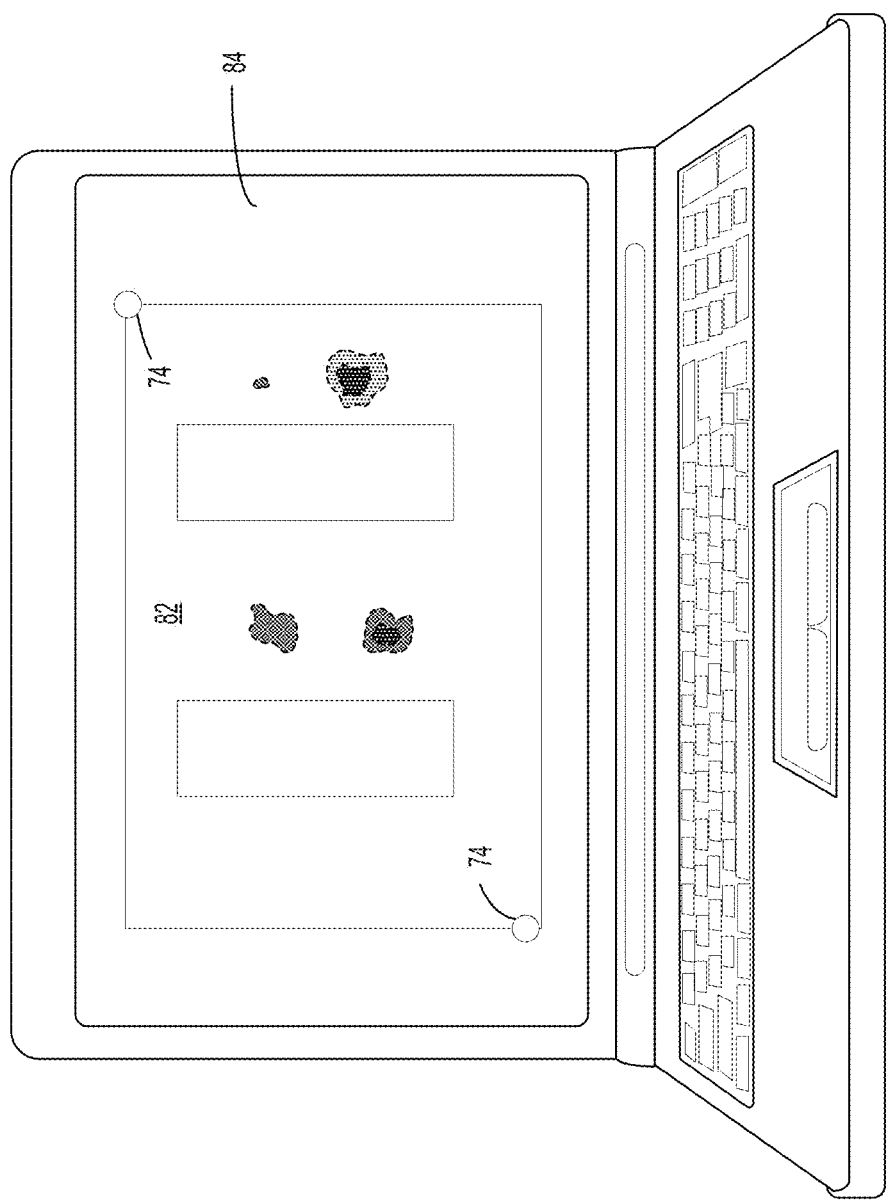
FIG. 12 shows an example two-dimensional visualization model being displayed via a flat display of the computer device of FIG. 1.

FIG. 12 illustrates an example of the two-dimensional visualization model 82 generated in FIG. 11 being presented via another display device 84 separate from the computer device 10. In the illustrated example, the two-dimensional image of the visualization model is displayed via a laptop. However, it should be appreciated that other types of displays may be used to present the two-dimensional visualization model 82. In one example, the computer device 10 may take the form of a server system such as a cloud platform. To display the visualization model 82, the computer device 10 may be configured to output data for the visualization model 82 to a client computer device to cause the client computer device to display the visualization model 82.

Using the techniques described above, position information for the telemetry data 24 may be captured in a format that provides the capability for the computer device 10 to visualize and present that telemetry data in different forms, scales, and display methods including augmented reality models, two-dimensional models, etc. It should be appreciated that while the examples described above use a heat-map as the visualization model for the telemetry data 24, other types of models may be used to present the telemetry data 24.

In one example, the visualization model 72 may take the form of a workflow exception model that presents data indicating deviations of a user from a set workflow. Turning back to FIG. 1, in a runtime phase, the one or more processors 12 of the computer device 10 may be configured to identify a workflow 86 including one or more expected telemetry events 88 and a route 90 in the workspace 38. The expected telemetry events 88 may take the form of one of the types of telemetry events 24 that may be detected via the telemetry devices 64, such as, for example, a pick or put event. A route 90 through the workspace 38 to perform the expected telemetry events 88 may also be determined. In one example, the computer device 10 may store user accounts for one or more users. A particular user may log into an associated user account on the computer device 10. Based on the user account, the computer device 10 may determine a workflow 86 for that user. It should be appreciated that workflows 86 may be generated via any suitable technique for the workspace 38.

Figure 13:
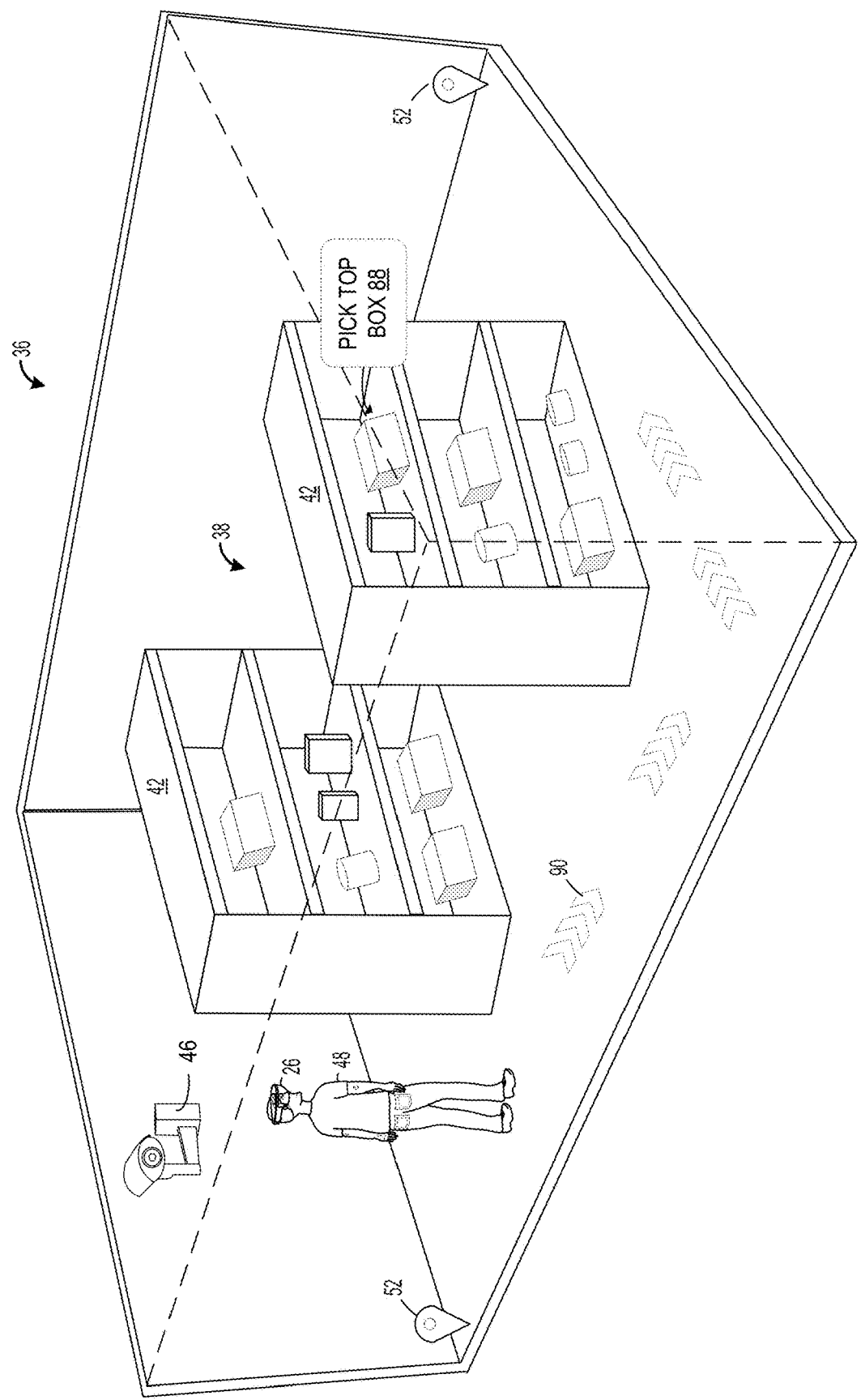
FIG. 13 shows example virtual instructions displayed to a user for a workflow that includes a route and an expected telemetry event using the computer device of FIG. 1.

FIG. 13 illustrates an example where the one or more processors 12 may be further configured to output instructions for the workflow 86 to the user indicating the one or more expected telemetry events 88 and the route 90 in the workspace 38. The instructions may, for example, be output via the near-eye display of the HMD device 26 worn by the user. However, it should be appreciated that other techniques may be used to present the instructions for the workflow 86 to the user, such as, for example, a sound file played from a speaker system or another type of output device. In the example illustrated in FIG. 13, the HMD device 26 may display virtual chevrons or arrows that indicate a direction that the user 48 should walk to follow the route 90 of the workflow 86 identified for that user 48. The HMD device 26 also output instructions for the user 48 to complete an expected telemetry event 88 to pick the top box on the shelf after following the route 90. It should be appreciated that other types of visual images and holograms may be displayed to the user 48 to convey instructions for the workflow 86.

Additionally, the one or more processors 12 may be configured to receive telemetry data 24 from the telemetry device 64 for a user performing the workflow 86. As a specific example, the user may be wearing the HMD device 26. Instructions for the workflow 86 may be presented via the display of the HMD device. As the user completes the workflow 86, telemetry events 24 may be detected by the telemetry device 64, such as a camera of the HMD device 24, and aggregated on the computer device 10. The one or more processors 12 may then be configured to compare the aggregated telemetry data 24 to the identified workflow 86. For example, the one or more processors 12 may be configured to determine whether the telemetry events 68 of the receive telemetry data 24 match the expected telemetry events 88 of the workflow 86 for the user.

Based on the comparison, the one or more processors 12 may be configured to determine one or more exception events 92 indicating a deviation from the identified workflow 86 based on the aggregated telemetry data 24. An exception event 92 may, for example, be determined if the telemetry data indicates that the user had a pick event at an incorrect location, or had a pick event for an incorrect item. As another example, an exception event 92 may be determined if a rerouting telemetry event is detected by the telemetry device 64 that caused the user to deviate from the route 90 of the workflow 86. It should be appreciated that the examples described herein are not limiting, and that other factors may cause the one or more processors 12 to determine that an exception event 92 has occurred. For example, an error telemetry event, an incident telemetry event such as a spill event may also cause the one or more processors 12 to determine an exception event 92.

The determined exception events 92 further include position information indicating a location of the exception event relative to the pair of anchor points 52 in the workspace 38. The position information for the exception events 92 may be determined in the same manner as the telemetry events 24. The one or more processors 12 may be configured to aggregate the exception event 92 data and then project the one or more exception events 92 to the visualization model 72 by mapping the position information of the one or more exception events 92 to the pair of points 74 in the visualization model 72 in the same manner as described above with respect to the aggregated telemetry data.

Figure 14:
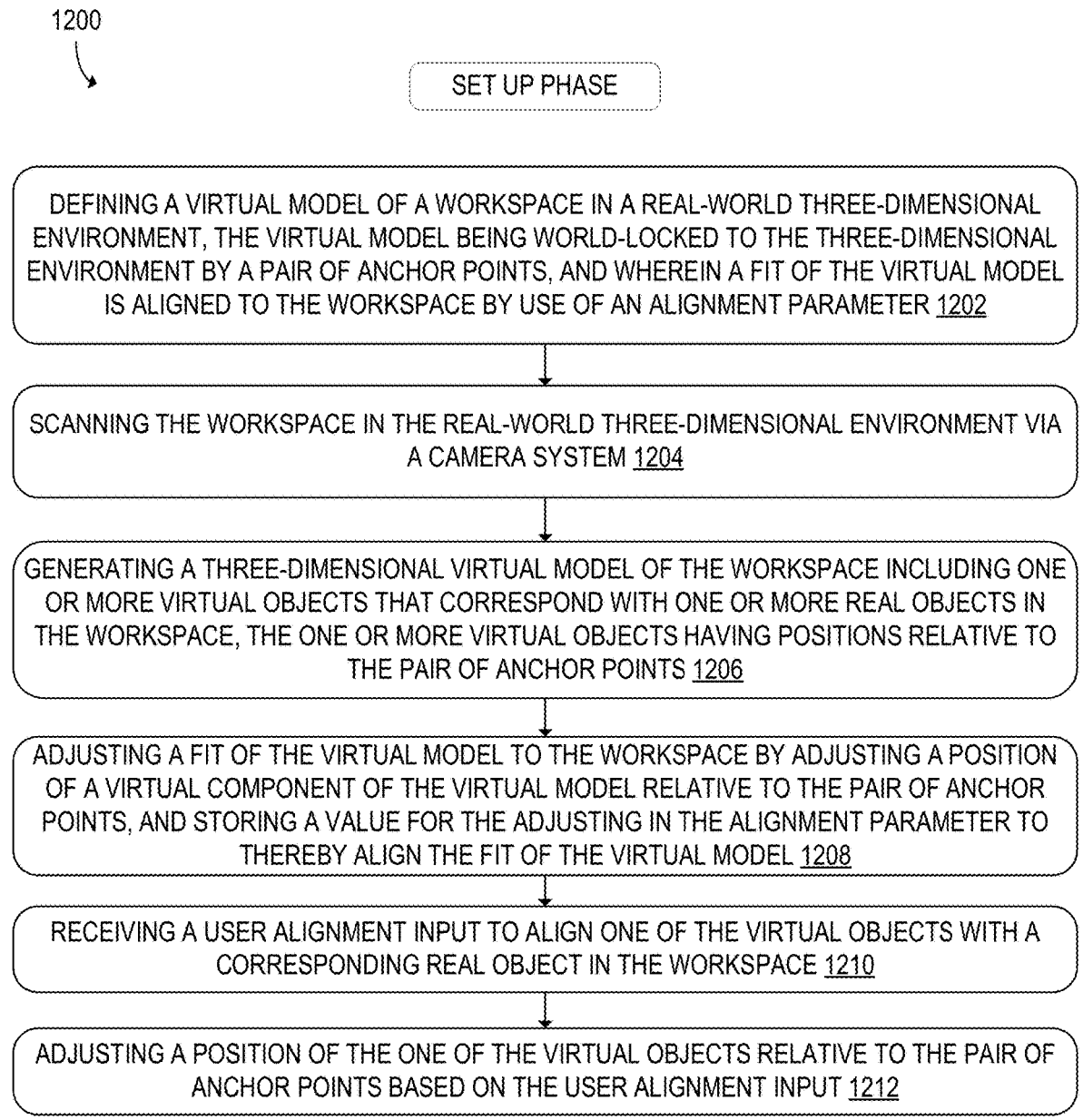
FIG. 14 shows a flow chart of a set up phase for a method for determining position information for gathered telemetry data relative to a pair of anchor points in a virtual model of a workspace and projecting the telemetry data to visualization models implemented by the computer device of FIG. 1.
Figure 15:
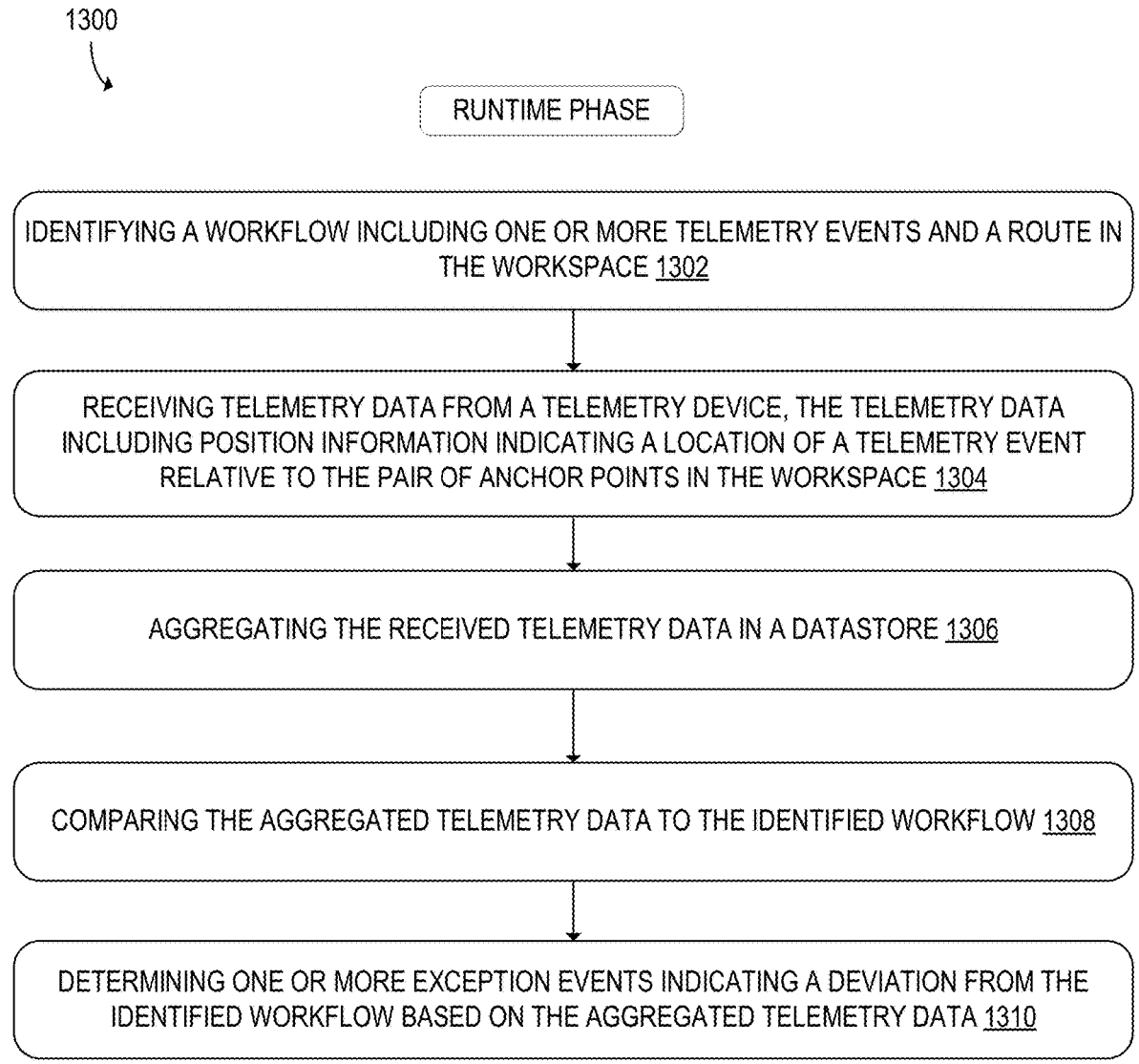
FIG. 15 shows a flow chart of a runtime phase of the method of FIG. 12.
Figure 16:
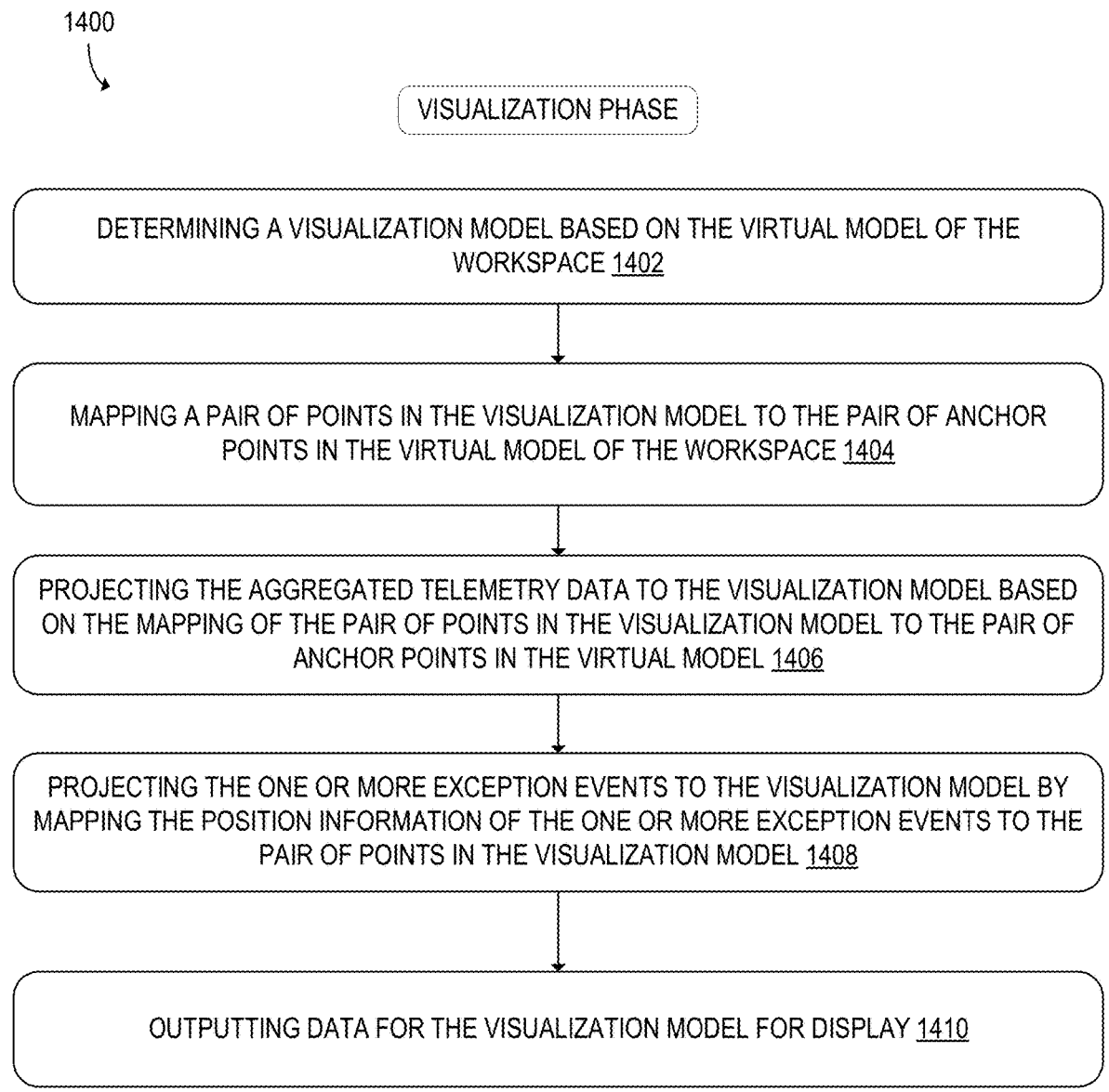
FIG. 16 shows a flow chart of a visualization phase of the method of FIG. 12.

FIGS. 14-16 show flowcharts for method 1200, 1300, and 1400 that may be implemented by one or more processors of a computer system. As illustrated in FIG. 14, at 1202 the method 1200 may include, in a set up phase, defining a virtual model of a workspace in a real-world three-dimensional environment. The virtual model is world-locked to the three-dimensional environment by a pair of anchor points. Additionally, a fit of the virtual model is aligned to the workspace by use of an alignment parameter. As a specific example, the workspace may take the form of a room in a warehouse. The virtual model may be defined to cover a portion of or all of the room in the warehouse. In one example, the pair of anchor points may be set at two opposite positions of the workspace, such as, for example, opposite corners in the room. The pair of anchor points may be set up by a user, or automatically placed based on identifiable features of the room that are machine recognizable.

At 1204, the method 1200 may include scanning the workspace in the real-world three-dimensional environment via a camera system. The camera system may, for example, include outward facing camera devices of an HMD device worn by a user. The workspace may be scanned as the user walks throughout the workspace in successive images.

At 1206, the method 1200 may include generating a three-dimensional virtual model of the workspace including one or more virtual objects that correspond with one or more real objects in the workspace, the one or more virtual objects having positions relative to the pair of anchor points. SLAM and surface reconstruction techniques may be used to identify surfaces in the workspace and programmatically generate a virtual model of the scanned workspace. One technique for generating virtual objects that correspond to real objects in the workspace is described above with reference to FIG. 6.

In one example, the virtual model may be manually generated by a user using an interface to generate and adjust virtual objects. The user may modify dimensions of the virtual model and internal virtual components to fit the virtual model to the real-world environment.

At 1208, the method 1200 may include adjusting a fit of the virtual model to the workspace by adjusting a position of a virtual component of the virtual model relative to the pair of anchor points, and storing a value for the adjusting in the alignment parameter to thereby align the fit of the virtual model. For example, to aid the user in adjusting a fit of the virtual model, the virtual model may be displayed to the user superimposed onto the workspace being modeled. The user may then identify errors in the fit, and provide alignment input to adjust the fit appropriately. After adjusting the fit of the virtual model, step 1208 may further include storing a value for the adjusting in the alignment parameter to thereby align the fit of the virtual model.

At 1210, the method 1200 may include receiving a user alignment input to align one of the virtual objects with a corresponding real object in the workspace. In one example, the alignment input may be received via a grab and drag gesture input, or another suitable type of input.

At 1212, the method 1200 may include adjusting a position of the one of the virtual objects relative to the pair of anchor points based on the user alignment input. The updated positions may be stored with the virtual model on the computer device 10.

FIG. 15 shows a flowchart for a method 1300. At 1302, the method 1300 may include, in a runtime phase, identifying a workflow including one or more telemetry events and a route in the workspace. Each user may have an associated workflow that has been defined for that user. The identified workflow may also be presented to the user via a display of an HMD worn by the user, or via another output modality. The user may then perform the workflow as instructed.

At 1304, the method 1300 may include receiving telemetry data from a telemetry device, the telemetry data including position information indicating a location of a telemetry event relative to the pair of anchor points in the workspace. The telemetry data may be detected and received as the user performs the workflow identified at 1302. In one example, the telemetry events may include events such as an incident event, a pick event, a put event, a reroute event, a forklift event, a notification event, a scan event, an error event, and a user event.

At 1306, the method 1300 may include aggregating the received telemetry data in a datastore. The aggregated telemetry data may be stored on the computer device.

At 1308, the method 1300 may include comparing the aggregated telemetry data to the identified workflow.

At 1310, the method 1300 may include determining one or more exception events indicating a deviation from the identified workflow based on the aggregated telemetry data, the one or more exception events including position information indicating a location of the exception event relative to the pair of anchor points in the workspace. For example, the telemetry events of the received telemetry data may be compared to the expected telemetry events of the workflow for the user. Based on the comparison, an exception event indicating a deviation from the identified workflow may be determined. As a specific example, an exception event may be determined if the telemetry data indicates that the user had a pick event at an incorrect location, or had a pick event for an incorrect item.

FIG. 16 shows a flowchart for a method 1400. At 1402, the method 1400 may include, in a visualization phase, determining a visualization model based on the virtual model of the workspace. In one example, the visualization model is a two-dimensional visualization model that may be displayed via a laptop or desktop display device. In another example, the visualization model is a three-dimensional augmented reality model that may be displayed via a near-eye display of an HMD device.

At 1404, the method 1400 may include mapping a pair of points in the visualization model to the pair of anchor points in the virtual model of the workspace.

At 1406, the method 1400 may include projecting the aggregated telemetry data to the visualization model based on the mapping of the pair of points in the visualization model to the pair of anchor points in the virtual model. At 1408, the method 1400 may include projecting the one or more exception events to the visualization model by mapping the position information of the one or more exception events to the pair of points in the visualization model.

At 1410, the method 1400 may include outputting data for the visualization model for display. In one example, the data for the visualization model may be sent to a client computer device for display via a display device of the client computer device. In another example, the data for the visualization model may be sent to a local display device for presentation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
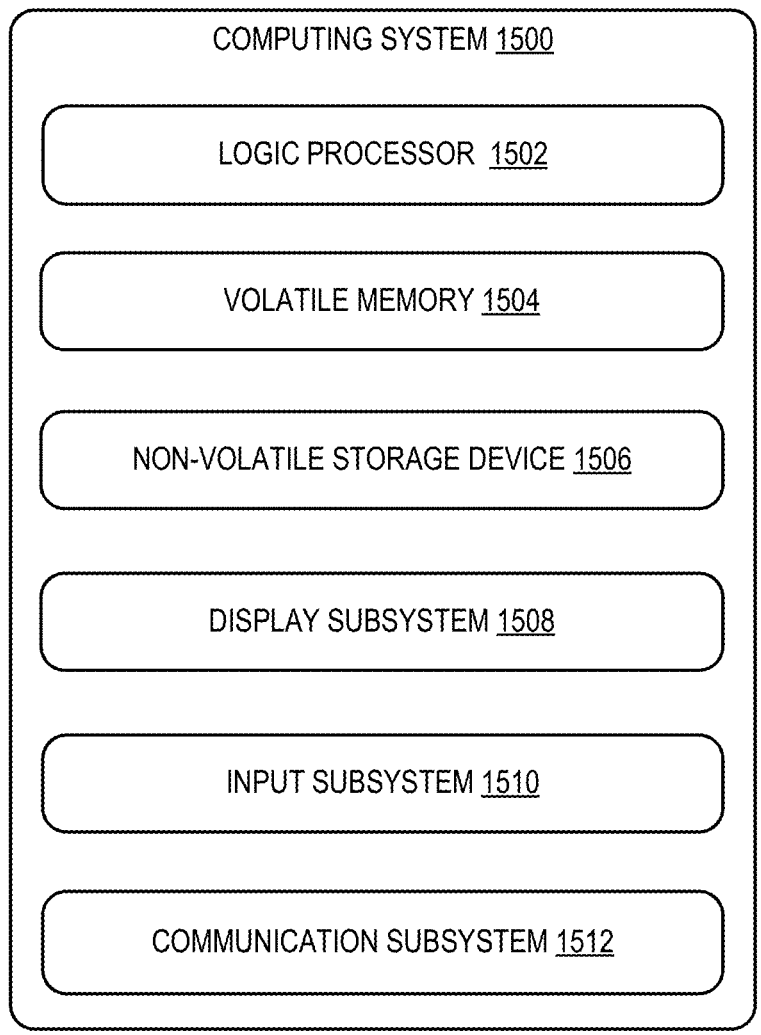
FIG. 17 shows a schematic view of an example computing environment in which the computer device of FIG. 1 may be enacted.

FIG. 17 schematically shows a non-limiting embodiment of a computing system 1500 that can enact one or more of the methods and processes described above. Computing system 1500 is shown in simplified form. Computing system 1500 may embody the computer device 10 described above and illustrated in FIG. 1. Computing system 1500 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 1500 includes a logic processor 1502 volatile memory 1504, and a non-volatile storage device 1506. Computing system 1500 may optionally include a display subsystem 1508, input subsystem 1510, communication subsystem 1512, and/or other components not shown in FIG. 17.

Logic processor 1502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1506 includes one or more physical devices configured to hold instructions executable by the logic processors to implement the methods and processes described herein. When such methods and processes are implemented, the state of non-volatile storage device 1506 may be transformed—e.g., to hold different data.

Non-volatile storage device 1506 may include physical devices that are removable and/or built-in. Non-volatile storage device 1506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1506 may include nonvolatile, dynamic, static, read/write, read-only, sequential-access, location-addressable, file-addressable, and/or content-addressable devices. It will be appreciated that non-volatile storage device 1506 is configured to hold instructions even when power is cut to the non-volatile storage device 1506.

Volatile memory 1504 may include physical devices that include random access memory. Volatile memory 1504 is typically utilized by logic processor 1502 to temporarily store information during processing of software instructions. It will be appreciated that volatile memory 1504 typically does not continue to store instructions when power is cut to the volatile memory 1504.

Aspects of logic processor 1502, volatile memory 1504, and non-volatile storage device 1506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1500 typically implemented in software by a processor to perform a particular function using portions of volatile memory, which function involves transformative processing that specially configures the processor to perform the function. Thus, a module, program, or engine may be instantiated via logic processor 1502 executing instructions held by non-volatile storage device 1506, using portions of volatile memory 1504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1508 may be used to present a visual representation of data held by non-volatile storage device 1506. The visual representation may take the form of a graphical user interface (GUI). As the herein described methods and processes change the data held by the non-volatile storage device, and thus transform the state of the non-volatile storage device, the state of display subsystem 1508 may likewise be transformed to visually represent changes in the underlying data. Display subsystem 1508 may include one or more display devices utilizing virtually any type of technology. Such display devices may be combined with logic processor 1502, volatile memory 1504, and/or non-volatile storage device 1506 in a shared enclosure, or such display devices may be peripheral display devices.

When included, input subsystem 1510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1512 may be configured to communicatively couple various computing devices described herein with each other, and with other devices. Communication subsystem 1512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1500 to send and/or receive messages to and/or from other devices via a network such as the Internet.

The following paragraphs provide additional support for the claims of the subject application. One aspect provides a computer system comprising one or more processors configured to, in a set-up phase, define a virtual model of a workspace in a real-world three-dimensional environment. The virtual model is world-locked to the three-dimensional environment by a pair of anchor points. The one or more processors are further configured to adjust a fit of the virtual model to the workspace by adjusting a position of a virtual component of the virtual model relative to the pair of anchor points. The one or more processors are further configured to, in a runtime phase, receive telemetry data from a telemetry device. The telemetry data includes position information indicating a location of a telemetry event relative to the pair of anchor points in the workspace. The one or more processors are further configured to aggregate the received telemetry data in a datastore. The one or more processors are further configured to, in a visualization phase, determine a visualization model based on the virtual model of the workspace, map a pair of points in the visualization model to the pair of anchor points in the virtual model of the workspace, project the aggregated telemetry data to the visualization model based on the mapping of the pair of points in the visualization model to the pair of anchor points in the virtual model, and display the visualization model via a display of the computer system. In this aspect, additionally or alternatively, a scale of the visualization model may differ from the virtual model of the workspace, and the one or more processors may be configured to determine a scaling difference between the pair of points in the visualization model and the pair of anchor points of the virtual model of the workspace, and map the position information of the aggregated telemetry data to the pair of points of the visualization model based on the scaling difference. In this aspect, additionally or alternatively, the visualization model may be a two-dimensional visualization model, and the one or more processors may be configured to project the virtual model of the workspace and the aggregated telemetry data to the two-dimensional visualization model based on the mapping of the pair of points in the visualization model to the pair of anchor points in the virtual model. In this aspect, additionally or alternatively, the visualization model may be a three-dimensional augmented reality model, and the one or more processors may be configured to display the three-dimensional visualization model via a near-eye display device of the computer system. In this aspect, additionally or alternatively, the telemetry event of the received telemetry data may be selected from the group consisting of an incident event, a pick event, a put event, a reroute event, a forklift event, a notification event, a scan event, an error event, and a user event. In this aspect, additionally or alternatively, the one or more processors may be further configured to, in the runtime phase, identify a workflow including one or more telemetry events and a route in the workspace, and receive telemetry data from the telemetry device for a user performing the workflow. In this aspect, additionally or alternatively, the one or more processors may be further configured to, in the visualization phase, compare the aggregated telemetry data to the identified workflow, and determine one or more exception events indicating a deviation from the identified workflow based on the aggregated telemetry data. The one or more exception events may include position information indicating a location of the exception event relative to the pair of anchor points in the workspace. The one or more processors may be further configured to project the one or more exception events to the visualization model by mapping the position information of the one or more exception events to the pair of points in the visualization model. In this aspect, additionally or alternatively, the one or more processors may be further configured to output instructions for the workflow to the user indicating the one or more telemetry events and the route in the workspace. In this aspect, additionally or alternatively, to define the virtual model of the workspace, the one or more processors may be further configured to scan the workspace in the real-world three-dimensional environment via a camera system, and generate a three-dimensional virtual model of the workspace including one or more virtual objects that correspond with one or more real objects in the workspace, the one or more virtual objects having positions relative to the pair of anchor points. In this aspect, additionally or alternatively, the one or more processors may be further configured to receive a user alignment input to align a virtual object with a corresponding real object in the workspace, and adjust a position of the virtual object relative to the pair of anchor points based on the user alignment input.

Another aspect provides a method comprising, at one or more processors of a computer system, defining a virtual model of a workspace in a real-world three-dimensional environment. The virtual model is world-locked to the three-dimensional environment by a pair of anchor points, and a fit of the virtual model is aligned to the workspace by use of an alignment parameter. The method further comprises receiving telemetry data from a telemetry device, the telemetry data including position information indicating a location of a telemetry event relative to the pair of anchor points in the workspace. The method further comprises aggregating the received telemetry data in a datastore. The method further comprises, in a visualization phase, determining a visualization model based on the virtual model of the workspace, mapping a pair of points in the visualization model to the pair of anchor points in the virtual model of the workspace, projecting the aggregated telemetry data to the visualization model based on the mapping of the pair of points in the visualization model to the pair of anchor points in the virtual model, and outputting data for the visualization model for display. In this aspect, additionally or alternatively, the method may further comprise adjusting a fit of the virtual model to the workspace by adjusting a position of a virtual component of the virtual model relative to the pair of anchor points, and storing a value for the adjusting in the alignment parameter to thereby align the fit of the virtual model. In this aspect, additionally or alternatively, a scale of the visualization model may differ from the virtual model of the workspace. The method may further comprise determining a scaling difference between the pair of points in the visualization model and the pair of anchor points of the virtual model of the workspace, and mapping the position information of the aggregated telemetry data to the pair of points of the visualization model based on the scaling difference. In this aspect, additionally or alternatively, the visualization model may be a two-dimensional visualization model, and the method may further comprise projecting the virtual model of the workspace and the aggregated telemetry data to the two-dimensional visualization model based on the mapping of the pair of points in the visualization model to the pair of anchor points in the virtual model. In this aspect, additionally or alternatively, the visualization model may be a three-dimensional augmented reality model, and the method may further comprise displaying the three-dimensional visualization model via a near-eye display device of the computer system. In this aspect, additionally or alternatively, the telemetry event of the received telemetry data may be selected from the group consisting of an incident event, a pick event, a put event, a reroute event, a forklift event, a notification event, a scan event, an error event, and a user event. In this aspect, additionally or alternatively, the method may further comprise, in the runtime phase, identifying a workflow including one or more telemetry events and a route in the workspace, and receiving telemetry data from the telemetry device for a user performing the workflow. In this aspect, additionally or alternatively, the method may further comprise, in the visualization phase, comparing the aggregated telemetry data to the identified workflow, and determining one or more exception events indicating a deviation from the identified workflow based on the aggregated telemetry data. The one or more exception events may include position information indicating a location of the exception event relative to the pair of anchor points in the workspace. The method may further comprise projecting the one or more exception events to the visualization model by mapping the position information of the one or more exception events to the pair of points in the visualization model. In this aspect, additionally or alternatively, defining the virtual model of the workspace may further comprise scanning the workspace in the real-world three-dimensional environment via a camera system, and generating a three-dimensional virtual model of the workspace including one or more virtual objects that correspond with one or more real objects in the workspace, the one or more virtual objects having positions relative to the pair of anchor points. In this aspect, additionally or alternatively, the method may further comprise receiving a user alignment input to align a virtual object with a corresponding real object in the workspace, and adjusting a position of the virtual object relative to the pair of anchor points based on the user alignment input.

Another aspect provides a computer system comprising one or more processors configured to, in a runtime phase, identify a workflow including one or more telemetry events and a route in the workspace, receive telemetry data from a telemetry device for a user performing the workflow, compare the received telemetry data to the identified workflow, and determine one or more exception events indicating a deviation from the identified workflow. The one or more exception events may include position information indicating a location of the exception event relative to the pair of anchor points in the workspace. The one or more processors are further configured to, in a visualization phase, determine a visualization model based on a virtual model of the workspace, map a pair of points in the visualization model to the pair of anchor points in the virtual model of the workspace, project the one or more exception events to the visualization model by mapping the position information of the one or more exception events to the pair of points in the visualization model, and display the visualization model via a display of the computer system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
one or more processors configured to:
in a set-up phase:
define a virtual model that is representative of a workspace in a real-world three-dimensional environment, wherein the virtual model includes one or more virtual components that represent corresponding real-world objects in the real-world three-dimensional environment, and wherein the virtual model is world-locked to the real-world three-dimensional environment by a pair of anchor points;
adjust a fit of the virtual model to the workspace by adjusting a position of a virtual component of the virtual model relative to the pair of anchor points;
in a runtime phase:
receive telemetry data from a telemetry device, the telemetry data including position information indicating a location of a telemetry event relative to the pair of anchor points in the workspace;
aggregate the received telemetry data in a datastore;
in a visualization phase:
determine a visualization model based on the virtual model of the workspace;
map a pair of points in the visualization model to the pair of anchor points in the virtual model of the workspace;
project the aggregated telemetry data to the visualization model based on the mapping of the pair of points in the visualization model to the pair of anchor points in the virtual model; and
display the visualization model with the aggregated telemetry data via a display of the computer system.

2. The computer system of claim 1, wherein a scale of the visualization model differs from the virtual model of the workspace; and wherein the one or more processors are configured to:

determine a scaling difference between the pair of points in the visualization model and the pair of anchor points of the virtual model of the workspace; and map the position information of the aggregated telemetry data to the pair of points of the visualization model based on the scaling difference.

3. The computer system of claim 1, wherein the visualization model is a two-dimensional visualization model; and wherein the one or more processors are configured to project the virtual model of the workspace and the aggregated telemetry data to the two-dimensional visualization model based on the mapping of the pair of points in the visualization model to the pair of anchor points in the virtual model.

4. The computer system of claim 1, wherein the visualization model is a three-dimensional augmented reality model; and wherein the one or more processors are configured to display the three-dimensional visualization model via a near-eye display device of the computer system.

5. The computer system of claim 1, wherein the telemetry event of the received telemetry data is selected from the group consisting of an incident event, a pick event, a put event, a reroute event, a forklift event, a notification event, a scan event, an error event, and a user event.

6. The computer system of claim 1, wherein the one or more processors are further configured to:

in the runtime phase:

identify a workflow including one or more telemetry events and a route in the workspace; and receive telemetry data from the telemetry device for a user performing the workflow.

7. The computer system of claim 6, wherein the one or more processors are further configured to:

in the runtime phase:

compare the aggregated telemetry data to the identified workflow;

determine one or more exception events indicating a deviation from the identified workflow based on the aggregated telemetry data, the one or more exception events including position information indicating a location of the exception event relative to the pair of anchor points in the workspace; and in the visualization phase:

project the one or more exception events to the visualization model by mapping the position information of the one or more exception events to the pair of points in the visualization model.

8. The computer system of claim 6, wherein the one or more processors are further configured to output instructions for the workflow to the user indicating the one or more telemetry events and the route in the workspace.

9. The computer system of claim 1, wherein to define the virtual model of the workspace, the one or more processors are further configured to:

scan the workspace in the real-world three-dimensional environment via a camera system; and generate a three-dimensional virtual model of the workspace based on data from the scan, the three-dimensional virtual model including the one or more virtual components that that represent corresponding real-world objects in the workspace, the one or more virtual components having positions relative to the pair of anchor points.

10. The computer system of claim 9, wherein the one or more processors are further configured to:

receive a user alignment input to align a virtual component with a corresponding real-world object in the workspace; and adjust a position of the virtual component relative to the pair of anchor points based on the user alignment input.

11. A method comprising:

at one or more processors of a computer system:

defining a virtual model that is representative of a workspace in a real-world three-dimensional environment, wherein the virtual model includes one or more virtual components that represent corresponding real-world objects in the real-world three-dimensional environment, and wherein the virtual model is world-locked to the real-world three-dimensional environment by a pair of anchor points, and wherein a fit of the virtual model is aligned to the workspace by use of an alignment parameter;

receiving telemetry data from a telemetry device, the telemetry data including position information indicating a location of a telemetry event relative to the pair of anchor points in the workspace;

aggregating the received telemetry data in a datastore;

determining a visualization model based on the virtual model of the workspace;

mapping a pair of points in the visualization model to the pair of anchor points in the virtual model of the workspace;

projecting the aggregated telemetry data to the visualization model based on the mapping of the pair of points in the visualization model to the pair of anchor points in the virtual model; and outputting data for the visualization model with the aggregated telemetry data for display.

12. The method of claim 11, further comprising:

adjusting the fit of the virtual model to the workspace by adjusting a position of a virtual component of the virtual model relative to the pair of anchor points, and storing a value for the adjusting in the alignment parameter to thereby align the fit of the virtual model.

13. The method of claim 11, wherein a scale of the visualization model differs from the virtual model of the workspace; and wherein the method further comprises:

determining a scaling difference between the pair of points in the visualization model and the pair of anchor points of the virtual model of the workspace; and mapping the position information of the aggregated telemetry data to the pair of points of the visualization model based on the scaling difference.

14. The method of claim 11, wherein the visualization model is a two-dimensional visualization model; and wherein the method further comprises projecting the virtual model of the workspace and the aggregated telemetry data to the two-dimensional visualization model based on the mapping of the pair of points in the visualization model to the pair of anchor points in the virtual model.

15. The method of claim 11, wherein the visualization model is a three-dimensional augmented reality model; and wherein the method further comprises displaying the three-dimensional visualization model via a near-eye display device of the computer system.

16. The method of claim 11, further comprising:
identifying a workflow including one or more telemetry events and a route in the workspace; and
receiving telemetry data from the telemetry device for a user performing the workflow.

17. The method of claim 16, further comprising:
comparing the aggregated telemetry data to the identified workflow;
determining one or more exception events indicating a deviation from the identified workflow based on the aggregated telemetry data, the one or more exception events including position information indicating a location of the exception event relative to the pair of anchor points in the workspace; and
projecting the one or more exception events to the visualization model by mapping the position information of the one or more exception events to the pair of points in the visualization model.

18. The method of claim 11, wherein defining the virtual model of the workspace further comprises:
scanning the workspace in the real-world three-dimensional environment via a camera system; and
generating a three-dimensional virtual model of the workspace based on data from the scan, the three-dimensional virtual model including the one or more virtual components that represent corresponding real-world objects in the workspace, the one or more virtual components having positions relative to the pair of anchor points.

19. The method of claim 18, further comprising:
receiving a user alignment input to align a virtual component with a corresponding real object in the workspace; and
adjusting a position of the virtual component relative to the pair of anchor points based on the user alignment input.

20. A computer system comprising:
one or more processors configured to:
  in a runtime phase:
    identify a workflow including one or more telemetry events and a route in a workspace;
    receive telemetry data from a telemetry device for a user performing the workflow;
    compare the received telemetry data to the identified workflow;
    determine one or more exception events indicating a deviation from the identified workflow, the one or more exception events including position information indicating a location of the exception event relative to the pair of anchor points in the workspace;
  in a visualization phase:
    determine a visualization model based on a virtual model of the workspace;
    map a pair of points in the visualization model to the pair of anchor points in the virtual model of the workspace;
    project the one or more exception events to the visualization model by mapping the position information of the one or more exception events to the pair of points in the visualization model; and
    display the visualization model via a display of the computer system.

* * * * *